US012480675B2

(12) United States Patent
Goltzman et al.

(10) Patent No.: US 12,480,675 B2
(45) Date of Patent: Nov. 25, 2025

(54) AIR FILTRATION MONITORING SYSTEM WITH LEARNING FEATURES

(71) Applicant: Donaldson Company, Inc., Bloomington, MN (US)

(72) Inventors: Chad M. Goltzman, Bloomington, MN (US); Charles E. Kotasek, Eden Prairie, MN (US); Peter P. Vitko, St. Paul, MN (US); Xiaobin Wang, Chanhassen, MN (US); Matthew J. Anderson, Minneapolis, MN (US); John H. Chastain, Jr., Eden Prairie, MN (US); Jacob C. Savstrom, Mound, MN (US)

(73) Assignee: Donaldson Company, Inc., Bloomington, MN (US)

( * ) Notice: Subject to any disclaimer, the term of this patent is extended or adjusted under 35 U.S.C. 154(b) by 409 days.

(21) Appl. No.: 17/695,555

(22) Filed: Mar. 15, 2022

(65) Prior Publication Data

US 2022/0290887 A1 Sep. 15, 2022

Related U.S. Application Data

(60) Provisional application No. 63/161,176, filed on Mar. 15, 2021.

(51) Int. Cl.
*G06F 11/30* (2006.01)
*F24F 11/39* (2018.01)
*F24F 11/84* (2018.01)

(52) U.S. Cl.
CPC .............. *F24F 11/39* (2018.01); *F24F 11/84* (2018.01)

(58) Field of Classification Search
CPC ........................................................ F24F 11/84
See application file for complete search history.

(56) References Cited

U.S. PATENT DOCUMENTS 5,329,465 A * 7/1994 Arcella ............... F16K 37/0083
706/915
6,740,412 B2 5/2004 Oreins et al.
(Continued)

FOREIGN PATENT DOCUMENTS

CN 111346440 6/2020
WO 9916538 4/1999
(Continued)

OTHER PUBLICATIONS

"International Search Report and Written Opinion," for PCT Application No. PCT/US2022/020425 mailed Aug. 18, 2022 (20 pages).
(Continued)

*Primary Examiner* — Phuong Huynh
(74) *Attorney, Agent, or Firm* — Pauly, De Vries Smith & Deffner LLC

(57) ABSTRACT

Embodiments herein relate to monitoring systems that can learn patterns of filtration system operation and then use the learned patterns to monitor ongoing filtration system operation/performance. In a first aspect, a monitoring system for an air filtration system is included having a control circuit, and a pressure sensor, wherein the pressure sensor is in electronic communication with the control circuit. The monitoring system can be configured to store data reflecting signals of the pressure sensor, evaluate the stored data representing a first time period to derive a valve operating pattern, and compare data from the pressure sensor obtained after the first time period against the derived valve operating pattern to identify an abnormal valve event.

15 Claims, 16 Drawing Sheets

(56) References Cited

U.S. PATENT DOCUMENTS

| | | |
|---|---|---|
| 6,964,694 B2 | 11/2005 | Rauchfuss et al. |
| 7,178,410 B2 | 2/2007 | Fraden et al. |
| 7,338,544 B2 | 3/2008 | Sporre et al. |
| 7,412,889 B2 | 8/2008 | Daoud |
| 7,641,708 B2 | 1/2010 | Kosmider et al. |
| 8,838,413 B2 | 9/2014 | Genta |
| 9,072,996 B2 | 7/2015 | Jornitz et al. |
| 9,092,040 B2 | 7/2015 | Fadell et al. |
| 9,389,157 B2 | 7/2016 | Bush |
| 9,416,739 B2 | 8/2016 | Jang |
| 10,174,863 B2 | 1/2019 | Bense |
| 2005/0189017 A1 | 9/2005 | Eryurek |
| 2005/0247131 A1 | 11/2005 | Breuer |
| 2011/0023709 A1* | 2/2011 | Bosshard ............ B01D 46/442 96/417 |
| 2015/0088321 A1 | 3/2015 | Schmidt et al. |
| 2016/0151733 A1* | 6/2016 | Fischer ............ B01D 46/0086 96/419 |
| 2017/0246565 A1 | 8/2017 | Miyaji et al. |
| 2019/0076771 A1 | 3/2019 | Baxter et al. |
| 2020/0122075 A1 | 4/2020 | Ventura et al. |

FOREIGN PATENT DOCUMENTS

| | | |
|---|---|---|
| WO | 2019207468 | 10/2019 |
| WO | 2022197732 | 9/2022 |

OTHER PUBLICATIONS

"Invitation to Pay Additional Fees," for PCT Application No. PCT/US2022/020425 mailed Jun. 27, 2022 (14 pages).

"International Preliminary Report on Patentability," for PCT Application No. PCT/US2022/020425 mailed Sep. 28, 2023 (13 pages).

* cited by examiner

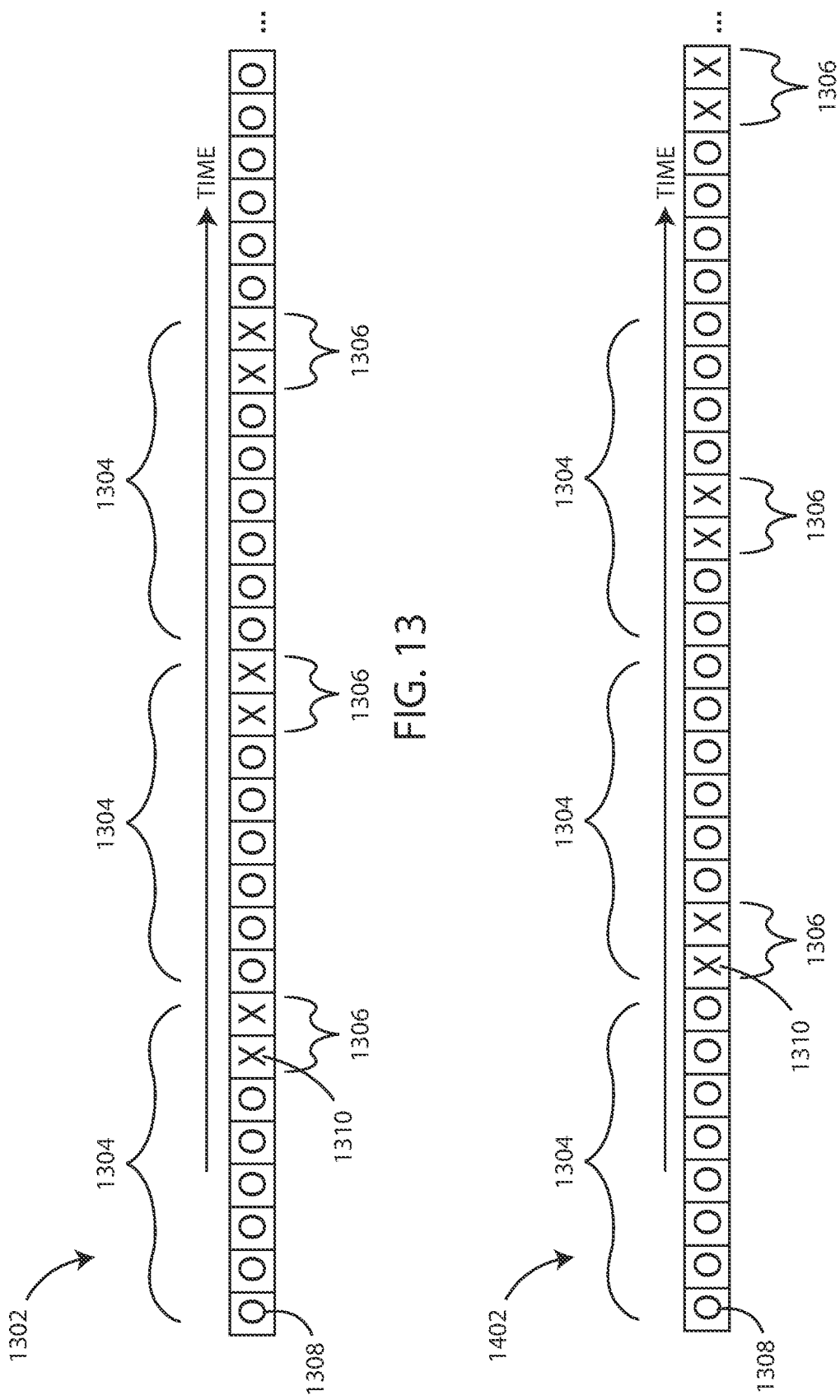

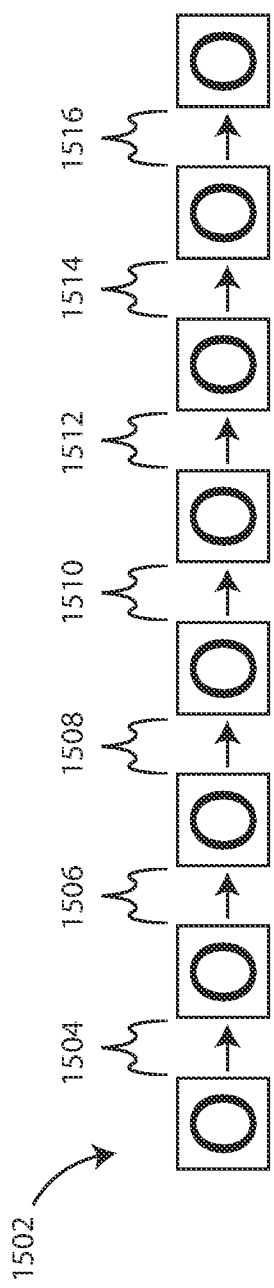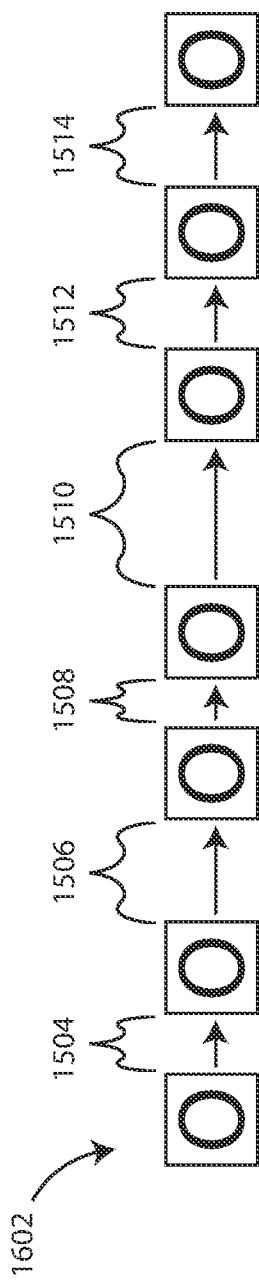

AIR FILTRATION MONITORING SYSTEM WITH LEARNING FEATURES

This application claims the benefit of U.S. Provisional Application No. 63/161,176, filed Mar. 15, 2021, the content of which is herein incorporated by reference in its entirety.

FIELD

Embodiments herein relate to monitoring devices for filtration systems. More specifically, embodiments herein relate to monitoring systems that can learn patterns of filtration system operation and then use the learned patterns to monitor ongoing filtration system operation/performance.

BACKGROUND

A variety of fluid filtration systems have been developed for particulate and contaminant removal. In some scenarios, systems for cleaning an air or other gas stream laden with particulate matter include air filter assemblies that have filter elements disposed in a housing. The filter element can take various form including a bag, a sock, or a cartridge including a suitable filter media, fabric, pleated paper, etc. In operation, a gas stream contaminated with particulate matter is typically passed through the housing so that the particulate matter is captured and retained by one or more filter elements. Such filtration systems work quite reliably. However, needs for maintenance arise periodically.

SUMMARY

Embodiments herein relate to monitoring systems that can learn patterns of filtration system operation and then use the learned patterns to monitor ongoing filtration system operation/performance. In a first aspect, a monitoring system for an air filtration system is included having a control circuit, and a pressure sensor, wherein the pressure sensor is in electronic communication with the control circuit. The monitoring system is configured to store data reflecting signals of the pressure sensor, evaluate the stored data representing a first time period to derive a valve operating pattern, and compare data from the pressure sensor obtained after the first time period against the derived valve operating pattern to identify an abnormal valve event.

In a second aspect, in addition to one or more of the preceding or following aspects, or in the alternative to some aspects, the monitoring system does not receive electrical signals from a control system of the air filtration system regarding a control signal to open valves.

In a third aspect, in addition to one or more of the preceding or following aspects, or in the alternative to some aspects, the monitoring system can be configured to send a notification if an abnormal valve event is identified.

In a fourth aspect, in addition to one or more of the preceding or following aspects, or in the alternative to some aspects, the pressure sensor can be configured to measure pressure in the air filtration system in a compressed air manifold.

In a fifth aspect, in addition to one or more of the preceding or following aspects, or in the alternative to some aspects, the pressure sensor can include an array of pressure sensors.

In a sixth aspect, in addition to one or more of the preceding or following aspects, or in the alternative to some aspects, the abnormal valve event can include at least one of an abnormal valve opening event, an abnormal valve closing event, and an omitted valve opening event.

In a seventh aspect, in addition to one or more of the preceding or following aspects, or in the alternative to some aspects, further can include a microphone, wherein the monitoring system can be configured to use data from the microphone in combination with the data from the pressure sensor to derive the valve operating pattern and identify the abnormal valve event.

In an eighth aspect, a method for monitoring valves in an air filtration system can be included, the method including storing data reflecting signals of a pressure sensor, evaluating the stored data representing a first time period to derive a valve operating pattern, and comparing data from the pressure sensor obtained after the first time period against the derived valve operating pattern to identify an abnormal valve event.

In a ninth aspect, in addition to one or more of the preceding or following aspects, or in the alternative to some aspects, the method can further include sending a notification if an abnormal valve event is identified.

In a tenth aspect, in addition to one or more of the preceding or following aspects, or in the alternative to some aspects, the method can further include measuring pressure in the air filtration system in a compressed air manifold.

In an eleventh aspect, in addition to one or more of the preceding or following aspects, or in the alternative to some aspects, the method can further include using data from the microphone in combination with the data from the pressure sensor to derive the valve operating pattern and identify the abnormal valve event.

In a twelfth aspect, a monitoring system for an air filtration system can be included having a control circuit and a pressure sensor in electronic communication with the control circuit. The monitoring system can be configured to operate in a first mode, record signals of the pressure sensor while operating in the first mode over a first time period, and generate one or more signal templates representing different operational states of a filtration system by processing the recorded signals of the pressure sensor while operating in the first mode over the first time period. The monitoring system can also be configured to operate in a second mode and compare signals of the pressure sensor obtained after the first time period against the one or more signal templates while operating in the second mode.

In a thirteenth aspect, in addition to one or more of the preceding or following aspects, or in the alternative to some aspects, the monitoring system can be configured to generate one or more signal templates representing different operational states of a filtration system valve by processing the recorded signals of the pressure sensor while operating in the first mode over the first time period.

In a fourteenth aspect, in addition to one or more of the preceding or following aspects, or in the alternative to some aspects, the monitoring system can be configured to check for one or more preconditions before generating one or more signal templates.

In a fifteenth aspect, in addition to one or more of the preceding or following aspects, or in the alternative to some aspects, the monitoring system can be configured to detect an abnormal valve event by matching signals of the second time period with a signal template.

In a sixteenth aspect, in addition to one or more of the preceding or following aspects, or in the alternative to some aspects, the monitoring system can be configured to detect a valve failure event by matching signals of the second time period with a signal template.

In a seventeenth aspect, in addition to one or more of the preceding or following aspects, or in the alternative to some aspects, the valve failure event can include improper closing of the valve.

In an eighteenth aspect, in addition to one or more of the preceding or following aspects, or in the alternative to some aspects, the valve failure event can include improper opening of the valve.

In a nineteenth aspect, in addition to one or more of the preceding or following aspects, or in the alternative to some aspects, the monitoring system can be configured to send a notification if a valve failure event is detected.

In a twentieth aspect, in addition to one or more of the preceding or following aspects, or in the alternative to some aspects, the monitoring system does not receive electrical signals from a control system of the air filtration system regarding a control signal to open valves.

In a twenty-first aspect, in addition to one or more of the preceding or following aspects, or in the alternative to some aspects, the pressure sensor can be configured to measure pressure in the air filtration system in a compressed air manifold.

In a twenty-second aspect, in addition to one or more of the preceding or following aspects, or in the alternative to some aspects, the system can further include a microphone and the monitoring system can be configured to use data from the microphone in combination with the data from the pressure sensor to generate the one or more signal templates and compare signals of the pressure sensor along with the microphone obtained after the first time period against the one or more signal templates while operating in the second mode.

In a twenty-third aspect, a method for monitoring valves in an air filtration system using a monitoring system can be included, the method including recording signals of a pressure sensor while the monitoring system can be operating in a first mode over a first time period, generating one or more signal templates representing different operational states of a filtration system by processing the recorded signals of the pressure sensor while the monitoring system is operating in the first mode over the first time period, and comparing signals of the pressure sensor obtained after the first time period against the one or more signal templates while the monitoring system is operating in a second mode.

In a twenty-fourth aspect, in addition to one or more of the preceding or following aspects, or in the alternative to some aspects, the method can further include generating one or more signal templates representing different operational states of a filtration system valve by processing the recorded signals of the pressure sensor while operating in the first mode over the first time period.

In a twenty-fifth aspect, in addition to one or more of the preceding or following aspects, or in the alternative to some aspects, the method can further include checking for one or more preconditions before generating one or more signal templates.

In a twenty-sixth aspect, in addition to one or more of the preceding or following aspects, or in the alternative to some aspects, the method can further include detecting an abnormal valve event by matching signals of the second time period with a signal template.

In a twenty-seventh aspect, in addition to one or more of the preceding or following aspects, or in the alternative to some aspects, the method can further include detecting a valve failure event by matching signals of the second time period with a signal template.

In a twenty-eighth aspect, in addition to one or more of the preceding or following aspects, or in the alternative to some aspects, the method can further include sending a notification if a valve failure event can be detected.

In a twenty-ninth aspect, in addition to one or more of the preceding or following aspects, or in the alternative to some aspects, the method can further include measuring pressure in the air filtration system in a compressed air manifold.

In a thirtieth aspect, in addition to one or more of the preceding or following aspects, or in the alternative to some aspects, the method can further include using data from the microphone in combination with the data from the pressure sensor to generate the one or more signal templates and compare signals of the pressure sensor along with the microphone obtained after the first time period against the one or more signal templates while operating in the second mode.

In a thirty-first aspect, a monitoring system for an air filtration system can be included having a control circuit and a pressure sensor in electronic communication with the control circuit. The monitoring system can be configured to store data reflecting signals of the pressure sensor, evaluate the stored data representing a first time period to derive a starting pattern, compare data from the pressure sensor obtained after the first time period against the starting pattern, and identify an abnormal valve event based on a detected difference between data after the first time period and the starting pattern.

In a thirty-second aspect, in addition to one or more of the preceding or following aspects, or in the alternative to some aspects, the abnormal valve event includes an air filtration valve failure event.

In a thirty-third aspect, in addition to one or more of the preceding or following aspects, or in the alternative to some aspects, the air filtration valve failure event can include improper closing of the valve.

In a thirty-fourth aspect, in addition to one or more of the preceding or following aspects, or in the alternative to some aspects, the air filtration valve failure event can include improper opening of the valve.

In a thirty-fifth aspect, in addition to one or more of the preceding or following aspects, or in the alternative to some aspects, the monitoring system does not receive electrical signals from a control system of the air filtration system regarding the opening of valves.

In a thirty-sixth aspect, in addition to one or more of the preceding or following aspects, or in the alternative to some aspects, the monitoring system can be configured to send a notification if an abnormal valve event is identified.

In a thirty-seventh aspect, in addition to one or more of the preceding or following aspects, or in the alternative to some aspects, the detected difference can be a difference that crosses a predetermined threshold value.

In a thirty-eighth aspect, in addition to one or more of the preceding or following aspects, or in the alternative to some aspects, the detected difference can be a difference that crosses a dynamically determined threshold value.

In a thirty-ninth aspect, in addition to one or more of the preceding or following aspects, or in the alternative to some aspects, the pressure sensor can be configured to measure pressure in the air filtration system in a compressed air manifold.

In a fortieth aspect, in addition to one or more of the preceding or following aspects, or in the alternative to some aspects, the pressure sensor can include an array of pressure sensors.

In a forty-first aspect, in addition to one or more of the preceding or following aspects, or in the alternative to some aspects, further can include a microphone, wherein the monitoring system can be configured to use data from the microphone in combination with the data from the pressure sensor to derive the starting pattern and identify the abnormal valve event.

In a forty-second aspect, a method of monitoring valves of an air filtration system with a monitoring system can be included. The method can include storing data reflecting signals of a pressure sensor, evaluating the stored data representing a first time period to derive a starting pattern, comparing data from the pressure sensor obtained after the first time period against the starting pattern, and identifying an abnormal valve event based on a detected difference between data after the first time period and the starting pattern.

In a forty-third aspect, in addition to one or more of the preceding or following aspects, or in the alternative to some aspects, the method can further include sending a notification if an abnormal valve event can be identified.

In a forty-fourth aspect, in addition to one or more of the preceding or following aspects, or in the alternative to some aspects, the method can further include measuring pressure in the air filtration system in a compressed air manifold.

In a forty-fifth aspect, in addition to one or more of the preceding or following aspects, or in the alternative to some aspects, the method can further include using data from the microphone in combination with the data from the pressure sensor to derive the starting pattern and identify the abnormal valve event.

In a forty-sixth aspect, a monitoring system for an air filtration system can be included having a control circuit and a microphone in electronic communication with the control circuit. The monitoring system can be configured to store data reflecting signals of the microphone, evaluate the stored data representing a first time period to derive a valve operating pattern, and compare data from the microphone obtained after the first time period against the derived valve operating pattern to identify an abnormal valve event.

In a forty-seventh aspect, in addition to one or more of the preceding or following aspects, or in the alternative to some aspects, the monitoring system does not receive electrical signals from a control system of the air filtration system regarding a control signal to open valves.

In a forty-eighth aspect, in addition to one or more of the preceding or following aspects, or in the alternative to some aspects, the monitoring system can be configured to send a notification if an abnormal valve event can be identified.

In a forty-ninth aspect, in addition to one or more of the preceding or following aspects, or in the alternative to some aspects, the microphone can be configured to generate signals reflecting sound in a compressed air manifold of the air filtration system.

In a fiftieth aspect, in addition to one or more of the preceding or following aspects, or in the alternative to some aspects, the microphone can include an array of microphones.

In a fifty-first aspect, in addition to one or more of the preceding or following aspects, or in the alternative to some aspects, the abnormal valve event can include at least one of an abnormal valve opening event, an abnormal valve closing event, and an omitted valve opening event.

In a fifty-second aspect, in addition to one or more of the preceding or following aspects, or in the alternative to some aspects, the system further can include a pressure sensor, wherein the pressure sensor can be configured to measure pressure in a compressed air manifold of the air filtration system and the monitoring system can be configured to store data reflecting signals of the pressure sensor along with data reflecting signals of the microphone, evaluate the stored data of both the pressure sensor and the microphone to derive a valve operating pattern, and compare data from both the pressure sensor and the microphone against the derived operating pattern to identify the abnormal valve event.

In a fifty-third aspect, a method of detecting abnormal valve events of a filtration system can be included. The method can include storing data reflecting signals of a microphone, evaluating the stored data representing a first time period to derive a valve operating pattern, and comparing data from the microphone obtained after the first time period against the derived valve operating pattern to identify an abnormal valve event.

In a fifty-fourth aspect, in addition to one or more of the preceding or following aspects, or in the alternative to some aspects, the method can further include sending a notification if an abnormal valve event can be identified.

In a fifty-fifth aspect, in addition to one or more of the preceding or following aspects, or in the alternative to some aspects, the method can further include generating signals reflecting sound in a compressed air manifold of an air filtration system.

In a fifty-sixth aspect, in addition to one or more of the preceding or following aspects, or in the alternative to some aspects, the method can further include measuring pressure in a compressed air manifold of the air filtration system, storing data reflecting signals of the pressure sensor along with data reflecting signals of the microphone, evaluating the stored data of both the pressure sensor and the microphone to derive a valve operating pattern, and comparing data from both the pressure sensor and the microphone against the derived operating pattern to identify the abnormal valve event.

In a fifty-seventh aspect, a monitoring system for an air filtration system can be included having a control circuit and a microphone in electronic communication with the control circuit. The monitoring system can be configured to operate in a first mode, record signals of the microphone while operating in the first mode over a first time period, generate one or more signal templates representing different operational states of a filtration system by processing the recorded signals of the pressure sensor while operating in the first mode over the first time period, operate in a second mode, and compare signals of the microphone obtained after the first time period against the one or more signal templates while operating in the second mode.

In a fifty-eighth aspect, in addition to one or more of the preceding or following aspects, or in the alternative to some aspects, the monitoring system can be configured to generate one or more signal templates representing different operational states of a filtration system valve by processing the recorded signals of the microphone while operating in the first mode over the first time period.

In a fifty-ninth aspect, in addition to one or more of the preceding or following aspects, or in the alternative to some aspects, the monitoring system can be configured to check for one or more preconditions before generating one or more signal templates.

In a sixtieth aspect, in addition to one or more of the preceding or following aspects, or in the alternative to some aspects, the monitoring system can be configured to detect an abnormal valve event by matching signals of the second time period with a signal template.

In a sixty-first aspect, in addition to one or more of the preceding or following aspects, or in the alternative to some aspects, the monitoring system can be configured to detect a valve failure event by matching signals of the second time period with a signal template.

In a sixty-second aspect, in addition to one or more of the preceding or following aspects, or in the alternative to some aspects, the valve failure event can include improper closing of the valve.

In a sixty-third aspect, in addition to one or more of the preceding or following aspects, or in the alternative to some aspects, the valve failure event can include improper opening of the valve.

In a sixty-fourth aspect, in addition to one or more of the preceding or following aspects, or in the alternative to some aspects, the monitoring system can be configured to send a notification if a valve failure event can be detected.

In a sixty-fifth aspect, in addition to one or more of the preceding or following aspects, or in the alternative to some aspects, the monitoring system does not receive electrical signals from a control system of the air filtration system regarding a control signal to open valves.

In a sixty-sixth aspect, in addition to one or more of the preceding or following aspects, or in the alternative to some aspects, the system can further include a pressure sensor, wherein the pressure sensor can be configured to measure pressure in a compressed air manifold of the air filtration system and the monitoring system can be configured to utilize signals of the pressure sensor in combination with signals of the microphone to generate signal templates and later compare signals against signal templates.

In a sixty-seventh aspect, a method of monitoring an air filtration system can be included. The method can include operating in a first mode, recording signals of a microphone while operating in the first mode over a first time period, generating one or more signal templates representing different operational states of a filtration system by processing the recorded signals of the pressure sensor while operating in the first mode over the first time period, operating in a second mode, and comparing signals of the microphone obtained after the first time period against the one or more signal templates while operating in the second mode.

In a sixty-eighth aspect, in addition to one or more of the preceding or following aspects, or in the alternative to some aspects, the method can further include generating one or more signal templates representing different operational states of a filtration system valve by processing the recorded signals of the microphone while operating in the first mode over the first time period.

In a sixty-ninth aspect, in addition to one or more of the preceding or following aspects, or in the alternative to some aspects, the method can further include checking for one or more preconditions before generating one or more signal templates.

In a seventieth aspect, in addition to one or more of the preceding or following aspects, or in the alternative to some aspects, the method can further include detecting an abnormal valve event by matching signals of the second time period with a signal template.

In a seventy-first aspect, in addition to one or more of the preceding or following aspects, or in the alternative to some aspects, the method can further include detecting a valve failure event by matching signals of the second time period with a signal template.

In a seventy-second aspect, in addition to one or more of the preceding or following aspects, or in the alternative to some aspects, the method can further include sending a notification if a valve failure event is detected.

In a seventy-third aspect, in addition to one or more of the preceding or following aspects, or in the alternative to some aspects, the method can further include measuring pressure in a compressed air manifold of the air filtration system and the method can be configured to utilize signals of the pressure sensor in combination with signals of the microphone to generate signal templates and later compare signals against signal templates.

In a seventy-fourth aspect, a monitoring system for an air filtration system can be included having a control circuit and a microphone in electronic communication with the control circuit. The monitoring system can be configured to store data reflecting signals of the microphone, evaluate the stored data representing a first time period to derive a starting pattern, compare data from the microphone obtained after the first time period against the starting pattern, and identify an abnormal valve event based on a detected difference between data after the first time period and the starting pattern.

In a seventy-fifth aspect, in addition to one or more of the preceding or following aspects, or in the alternative to some aspects, the abnormal valve event includes an air filtration valve failure event.

In a seventy-sixth aspect, in addition to one or more of the preceding or following aspects, or in the alternative to some aspects, the air filtration valve failure event can include improper closing of the valve.

In a seventy-seventh aspect, in addition to one or more of the preceding or following aspects, or in the alternative to some aspects, the air filtration valve failure event can include improper opening of the valve.

In a seventy-eighth aspect, in addition to one or more of the preceding or following aspects, or in the alternative to some aspects, the monitoring system does not receive electrical signals from a control system of the air filtration system regarding the opening of valves.

In a seventy-ninth aspect, in addition to one or more of the preceding or following aspects, or in the alternative to some aspects, the monitoring system can be configured to send a notification if an abnormal valve event is identified.

In an eightieth aspect, in addition to one or more of the preceding or following aspects, or in the alternative to some aspects, the detected difference can be a difference that crosses a predetermined threshold value.

In an eighty-first aspect, in addition to one or more of the preceding or following aspects, or in the alternative to some aspects, the detected difference can be a difference that crosses a dynamically determined threshold value.

In an eighty-second aspect, in addition to one or more of the preceding or following aspects, or in the alternative to some aspects, the microphone can be configured to generate signals reflecting sound in a compressed air manifold of the air filtration system.

In an eighty-third aspect, in addition to one or more of the preceding or following aspects, or in the alternative to some aspects, the microphone can include an array of microphones.

In an eighty-fourth aspect, in addition to one or more of the preceding or following aspects, or in the alternative to some aspects, the system can further include a pressure sensor, wherein the pressure sensor can be configured to measure pressure in a compressed air manifold of the air filtration system and the monitoring system can be configured to utilize signals of the pressure sensor in combination with signals of the microphone to derive a starting pattern and later compare signals gathered after the first time period against the starting pattern and identify an abnormal valve event.

In an eighty-fifth aspect, a method of identifying an abnormal valve event can be included. The method can include storing data reflecting signals of a microphone, evaluating the stored data representing a first time period to derive a starting pattern, comparing data from the microphone obtained after the first time period against the starting pattern, and identifying an abnormal valve event based on a detected difference between data after the first time period and the starting pattern.

In an eighty-sixth aspect, in addition to one or more of the preceding or following aspects, or in the alternative to some aspects, the method can further include sending a notification if an abnormal valve event can be identified.

In an eighty-seventh aspect, in addition to one or more of the preceding or following aspects, or in the alternative to some aspects, the method can further include generating signals reflecting sound in a compressed air manifold of an air filtration system.

In an eighty-eighth aspect, in addition to one or more of the preceding or following aspects, or in the alternative to some aspects, the method can further include measuring pressure in a compressed air manifold of the air filtration system, utilizing signals of the pressure sensor in combination with signals of the microphone to derive a starting pattern and later compare signals gathered after the first time period against the starting pattern and identifying an abnormal valve event.

In an eighty-ninth aspect, a monitoring system for an air filtration system can be included having a control circuit and a sensor in electronic communication with the control circuit. The monitoring system for an air filtration system can be configured to evaluate data reflecting signals of the sensor to detect valve opening events within a valve opening timing cycle, detect missing valve opening events within the valve opening timing cycle, and evaluate whether the order of missing valve opening events can be shifting within successive cycles to detect a misconfigured timing board.

In a ninetieth aspect, in addition to one or more of the preceding or following aspects, or in the alternative to some aspects, the sensor can include at least one selected from the group consisting of a microphone and a pressure sensor.

In a ninety-first aspect, in addition to one or more of the preceding or following aspects, or in the alternative to some aspects, the valve opening timing cycle can be dynamically determined.

In a ninety-second aspect, in addition to one or more of the preceding or following aspects, or in the alternative to some aspects, the valve opening timing cycle can be predetermined.

In a ninety-third aspect, in addition to one or more of the preceding or following aspects, or in the alternative to some aspects, the monitoring system for an air filtration system can be configured to issue a notification or alert when a misconfigured timing board can have been detected.

In a ninety-fourth aspect, in addition to one or more of the preceding or following aspects, or in the alternative to some aspects, the monitoring system for an air filtration system can be configured to initiate changing the configuration of the timing board when a misconfigured timing board can have been detected.

In a ninety-fifth aspect, a method of detecting timing board misconfiguration within a filtration system can be included. The method can include evaluating data reflecting signals of a sensor to detect valve opening events within a valve opening timing cycle, detecting missing valve opening events within the valve opening timing cycle, and evaluating whether the order of missing valve opening events can be shifting within successive cycles to detect a misconfigured timing board.

In a ninety-sixth aspect, in addition to one or more of the preceding or following aspects, or in the alternative to some aspects, the method can further include issuing a notification or alert when a misconfigured timing board has been detected.

In a ninety-seventh aspect, in addition to one or more of the preceding or following aspects, or in the alternative to some aspects, the method can further include initiating changing the configuration of the timing board when a misconfigured timing board has been detected.

In a ninety-eighth aspect, a monitoring system for an air filtration system can be included having a control circuit and a sensor in electronic communication with the control circuit. The monitoring system for an air filtration system can be configured to evaluate data reflecting signals of the sensor to detect valve opening events, determine time intervals between detected valve opening events, calculate a degree of regularity of determined time intervals, and determine that a timing board of the air filtration system can be malfunctioning when the degree of regularity crosses a threshold value.

In a ninety-ninth aspect, in addition to one or more of the preceding or following aspects, or in the alternative to some aspects, the sensor can include at least one selected from the group consisting of a microphone and a pressure sensor.

In a one hundred and aspect, in addition to one or more of the preceding or following aspects, or in the alternative to some aspects, the degree of regularity can include a standard deviation for determined time intervals.

In a one hundred and first aspect, in addition to one or more of the preceding or following aspects, or in the alternative to some aspects, the threshold value can be dynamically determined or preset.

In a one hundred and second aspect, in addition to one or more of the preceding or following aspects, or in the alternative to some aspects, the monitoring system for an air filtration system can be configured to issue a notification or alert when a malfunctioning timing board can have been determined.

In a one hundred and third aspect, in addition to one or more of the preceding or following aspects, or in the alternative to some aspects, the monitoring system for an air filtration system can be configured to initiate servicing or replacing the timing board when a malfunctioning timing board can have been determined.

In a one hundred and fourth aspect, a method of detecting a malfunctioning timing board within a filtration system can be included. The method can include evaluating data reflecting signals of a sensor to detect valve opening events, determining time intervals between detected valve opening events, calculating a degree of regularity of determined time intervals, and determining that a timing board of the air filtration system can be malfunctioning when the degree of regularity crosses a threshold value.

In a one hundred and fifth aspect, in addition to one or more of the preceding or following aspects, or in the alternative to some aspects, the method can further include issuing a notification or alert when a malfunctioning timing board has been determined.

In a one hundred and sixth aspect, in addition to one or more of the preceding or following aspects, or in the alternative to some aspects, the method can further include initiating servicing or replacing the timing board when a malfunctioning timing board has been determined.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which:

FIG. 13 is schematic illustration of a pattern of pulses for a dust collector with bad valves.

FIG. 14 is schematic illustration of a pattern of pulses illustrating dust collector timing board misconfiguration.

FIG. 15 is schematic illustration of a pattern of pulses consistent with a timing board for a dust collector operating normally.

FIG. 16 is schematic illustration of a pattern of pulses consistent with a timing board malfunctioning.

Figure 1:
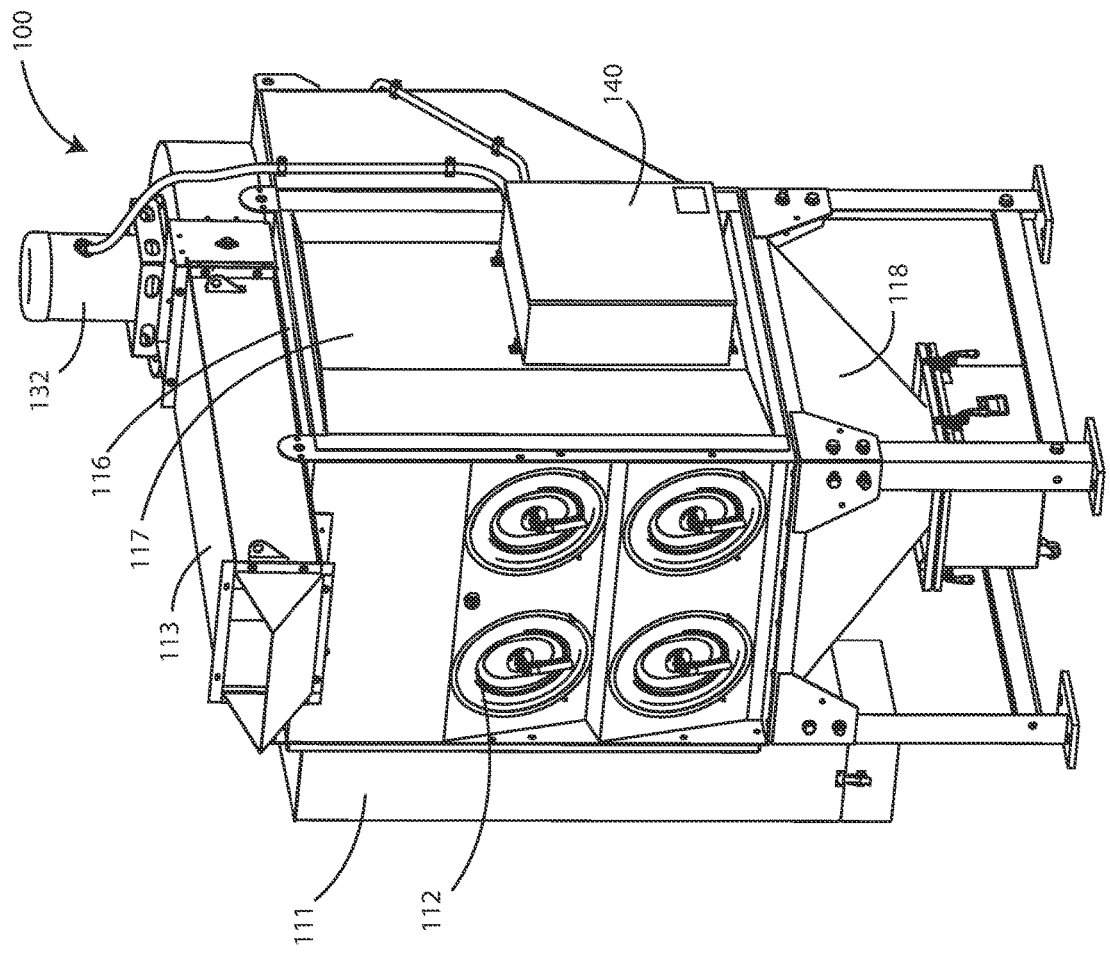
FIG. 1 is a schematic front perspective view of an air filtration system in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

As described above, there are many scenarios in which filtering particulate matter or other contaminants out of fluid streams is useful and there are many different types of filtration systems to accomplish the same. As an example, one type of an air filtration system has a clean air chamber (or clean/downstream side) and a dirty air chamber (or dirty/upstream side). The two chambers can be separated by a structure that can be referred to as a tube sheet, in many cases, the tube sheet has a number of openings so that air can pass between the clean and dirty air chambers. The filter elements can be positioned over the openings so that particulate-laden air (dirty air) introduced into the dirty air chamber must pass through a filter element to move into the dean air chamber. The particulate matter in the dirty air collects on the filter elements as the air moves through the filter elements. From the clean air chamber, the cleaned air is exhausted into the environment, or recirculated for other uses.

As the filter elements capture particulate matter, flow through the system is inhibited and periodic cleaning of the filter elements can be performed to increase air flow through the system. Cleaning can be accomplished by periodically pulsing a brief jet of air, such as pressurized air into, the interior of the filter element (which could include, a filter cartridge, filter bag, or the like) to reverse the air flow through the filter element, causing the collected particulate matter to be driven off the filter element. In some cases, pressurized air can be directed into pulse collectors as described in U.S. Pat. No. 7,338,544 (Sporre et al.) and U.S. Pat. No. 7,641,708 (Kosmider et al.), the content of both of which is herein incorporated by reference.

Keeping these air filtration systems working optimally can involve periodic maintenance including, but not limited to, replacing/cleaning filter elements, monitoring and replacing pulse valves, and the like. For example, pulse valves may eventually fail leading to waste of compressed air as well as reduced cleaning of filter elements. Monitoring aspects of the filtration system can provide indications regarding the optimal time for performing maintenance activities as well as identifying any other issues that may impact filtration system performance.

Unfortunately, it may not be feasible to tap into a control system of an existing filtration system installed in the field to implement monitoring capabilities. Further, operating patterns of filtration systems can be highly variable based on factors including the particular filtration system model, the particular environment of the installed filtration system, the types of particulates contaminants within the particular environment of the installed filtration system, and the types of components used in the filtration system (filter elements, valves, etc.), amongst other factors. These issues can make it difficult to design and implement monitoring systems that can be easily installed and widely used.

However, embodiments of filtration system monitoring systems herein can address the challenges described above by being capable of learning existing operating patterns after installation and then using the learned patterns to detect abnormal operating events, including, but not limited to, events such as abnormal pulse valve opening events, abnormal pulse valve closing events, abnormal pressure drop recovery after filter element cleaning and/or replacement, and the like. This learning approach of the monitoring system offers the benefits of being easily setup and being customized as much as possible to the particular filtration system, particular environment, particular particulates/contaminants, and particular components used, thus offering superior monitoring performance.

In various embodiments herein, a monitoring system for an air filtration system is included that can have a control circuit and a pressure sensor, wherein the pressure sensor is in electronic communication with the control circuit. The monitoring system can be configured to store data reflecting signals of the pressure sensor, evaluate the stored data representing a first time period to derive a valve operating pattern, and compare data from the pressure sensor reflecting a second time period against the derived valve operating pattern to identify an abnormal valve event. In some embodiments, the monitoring system can be configured to operate in a first mode, record signals of the pressure sensor while operating in the first mode over a first time period, generate one or more signal templates representing different operational states of a filtration system by processing the recorded signals of the pressure sensor while operating in the first mode over the first time period, operate in a second mode, and compare signals of the pressure sensor from a second time period against the one or more signal templates while operating in the second mode.

In some embodiments, the monitoring system can be configured to store data reflecting signals of the pressure sensor, evaluate the stored data representing a first time period to derive a starting pattern, compare data from the pressure sensor reflecting a second time period against the starting pattern, and identify an abnormal valve event based on a detected difference between the second time period data and the starting pattern. In some embodiments, microphone or vibration sensor data, or data from other sensors, can be used in addition to or in place of pressure data.

Referring now to FIG. 1, a schematic front perspective view is shown of an exemplary air filtration system 100 in accordance with various embodiments herein. In this example, the air filtration system 100 depicted in FIG. 1 is generally in the shape of a box and includes an upper wall panel 116, and two pairs of opposite side wall panels 117 (one of which is depicted in FIG. 1). It will be appreciated, however, that the air filtration system 100 can take on many different shapes and configurations.

The air filtration system 100 includes a dirty air conduit 111 for receiving dirty or contaminated air (i.e., air with particulate matter therein) into the air filtration system 100. A clean air conduit 113 can be provided for venting clean or filtered air from the air filtration system 100. The air filtration system 100 includes access openings 112 for multiple filter elements (not shown in FIG. 1). In use, each of the access openings 112 is sealed by a cover (not shown) such that dirty air entering the air filtration system 100 does not escape through the access openings 112.

The air filtration system 100 may also include a hopper 118 to collect particulate matter separated from the dirty air stream as described herein. The hopper 118 may include sloped walls to facilitate collection of the particulate matter and may, in some embodiments, include a driven auger or other mechanism for removing the collected particulate matter.

In some embodiments, the air filtration system 100 can include a fan 132 to provide movement of air through the air filtration system 100. However, in other embodiments, air can be pulled through the system with a fan or other equipment that is not part of the air filtration system 100.

The air filtration system 100 can include a preexisting control box 140, which can include a preexisting control circuit for the filtration system. In some embodiments, there is no electrical communication between the preexisting control box 140 and/or components therein such as a preexisting control circuit and a monitoring device herein. While not intending to be bound by theory, it is believed that this electronic separation can offer a security advantage as the preexisting control box 140 and components therein are responsible for operation of the filtration system 100 whereas the monitoring device is only responsible for monitoring of the filtration system 100. In this way, the monitoring device cannot be used as a means of gaining control over operation of the filtration system 100.

Figure 2:
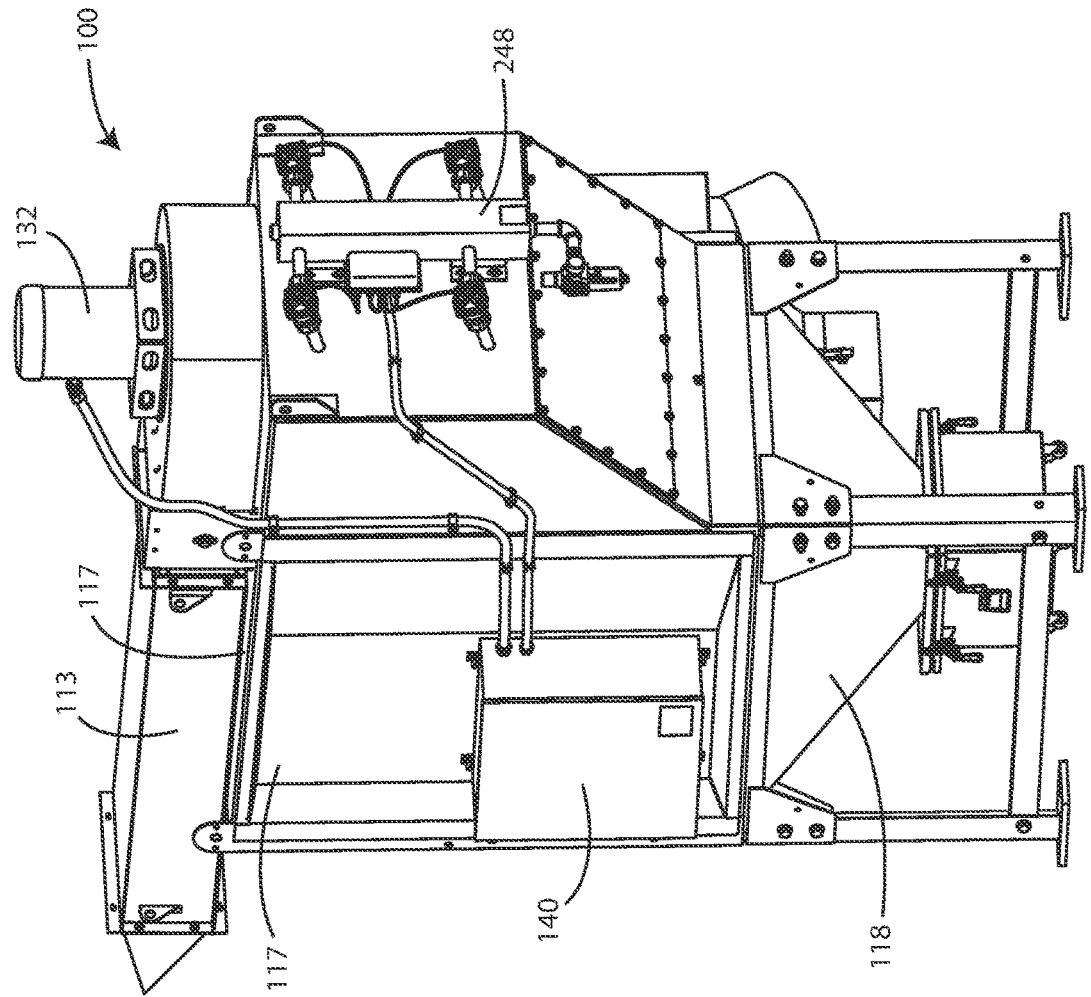
FIG. 2 is a schematic rear perspective view of an air filtration system with a monitoring device in accordance with various embodiments herein.

Referring now to FIG. 2, a schematic rear perspective view is shown of an air filtration system with a monitoring device in accordance with various embodiments herein. FIG. 2 shows many of the same elements as shown in FIG. 1, but from a rear perspective view. FIG. 2 also shows a compressed air manifold 248, the functionality of which is described with reference to FIG. 3 below.

Figure 3:
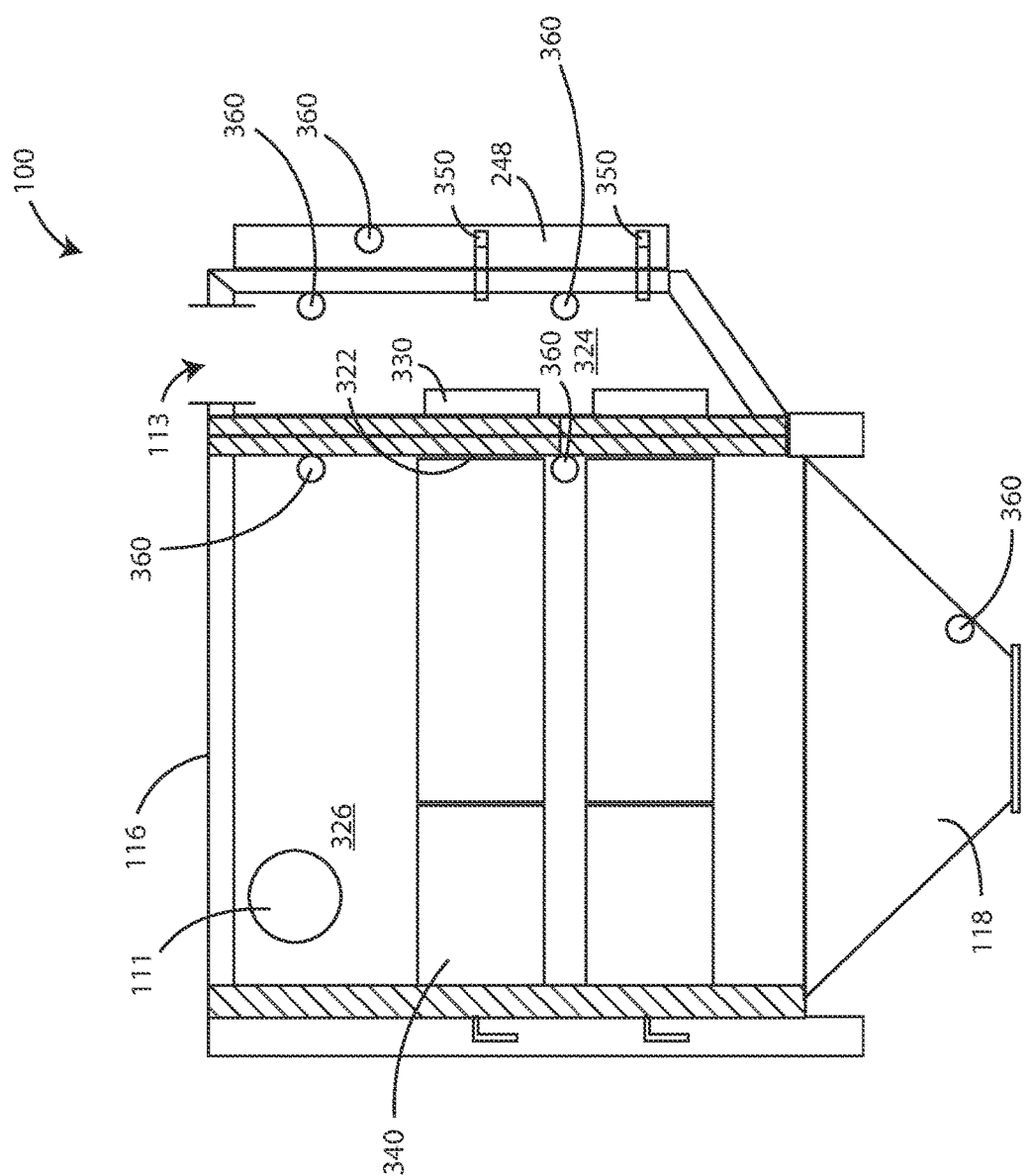
FIG. 3 is a schematic cross-sectional view of some aspects of an air filtration system in accordance with various embodiments herein.

Referring now to FIG. 3, a schematic cross-sectional view is shown of some aspects of an exemplary air filtration system 100 in accordance with various embodiments herein. The interior of the air filtration system 100 includes a tube sheet 322 that separates the interior of the housing into a clean air chamber 324 and a dirty air chamber 326. The air filtration system 100 includes a clean air conduit 113 through which clean air exits from the clean air chamber 324 during operation of the air filtration system 100. The depicted air filtration system 100 includes filter elements 340 in the dirty air chamber 326 (dirty side or upstream side).

Pulse collectors 330 can be included and can be disposed within the clean air chamber and can be attached to and/or adjacent to the tube sheet 322 over an aperture in the tube sheet 322 (not seen in FIG. 3) such that a pulse of air from the pulse generators 350 passing through the pulse collector 330 enters an interior volume of the filter elements 340. Air can be provided to the pulse generators 350 from a compressed air manifold 248, which itself can receive compressed air from an air compressor or central source of plant compressed air. The release of air from the compressed air manifold 248 to the pulse generators 350 can be controlled by valves (pulse valves) which can be of various types including, but not limited to, diaphragm valves, solenoid valves, and other valves for controlling fluid flow.

In accordance with various embodiments herein, pressure sensors and/or sound sensors (such as microphones or other sensors capable of picking up sound such as accelerometers) can be placed at various points in or near the filtration system. For example, FIG. 3 depicts sensors 360 within the compressed air manifold 248, within clean air chamber 324, within dirty air chamber 326, and within hopper 118. In some embodiments herein, pressure sensors can be included at all of these locations. In some embodiments, pressure sensors can be included at only one or more of these locations. In some embodiments, a pressure sensor can be located in an area of the air filtration system 100 other than a location shown in FIG. 3. In some embodiments, the location for sensors described can, instead of physical sensor placement, can refer to a location for which a sensor may be configured for detection. For example, the sensor itself may not actually be positioned in the particular area, but may nonetheless produce data reflecting pressure values as such locations.

Figure 4:
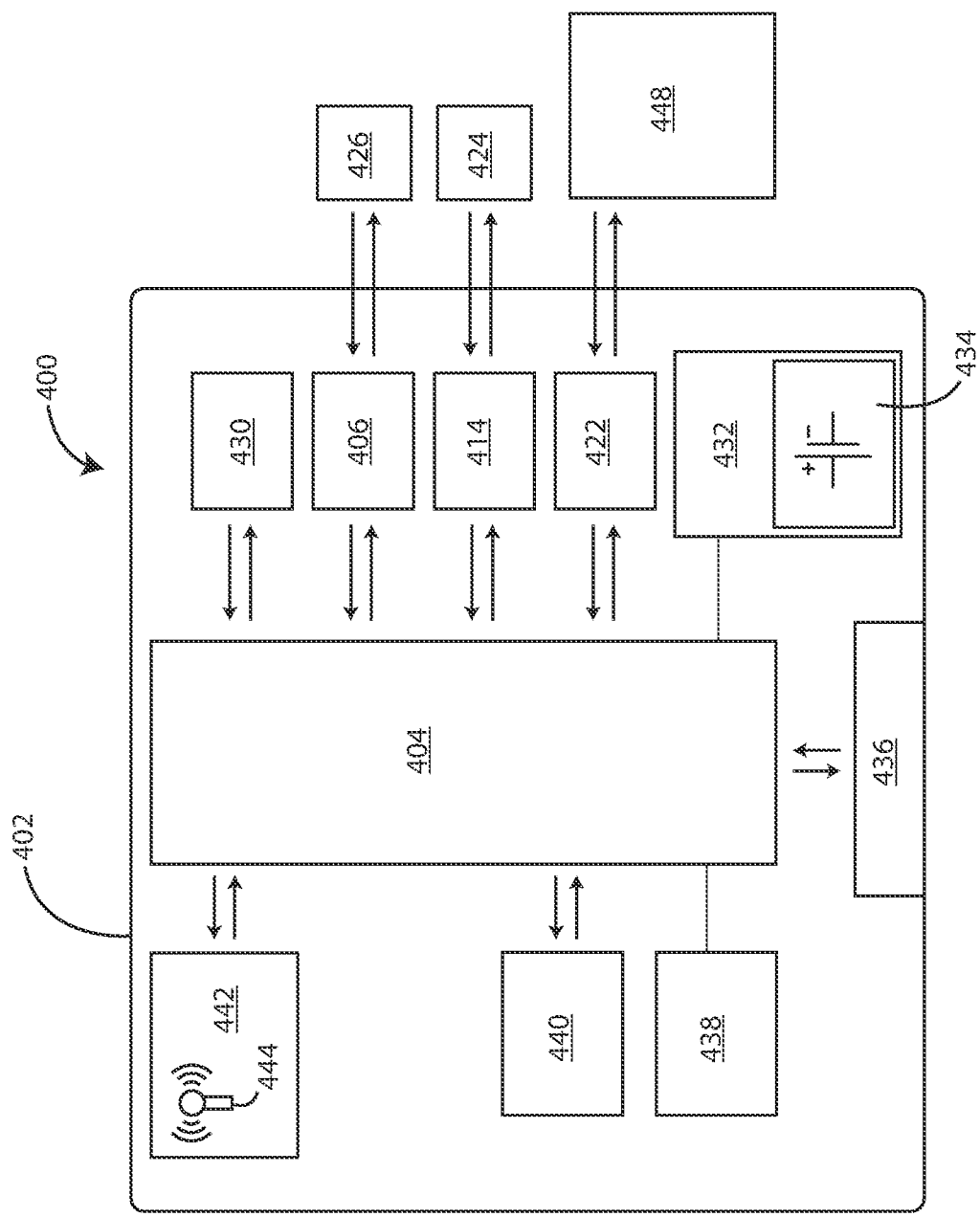
FIG. 4 is a schematic diagram is shown of elements of a monitoring device in accordance with various embodiments herein.

Referring now to FIG. 4, a schematic diagram is shown of elements of a monitoring device 400 in accordance with various embodiments herein. It will be appreciated that a greater or lesser number of components can be included with various embodiments and that this schematic diagram is merely illustrative. The monitoring device 400 can include a housing 402 and a control circuit 404.

The control circuit 404 can include various electronic components including, but not limited to, a microprocessor, a microcontroller, a FPGA (field programmable gate array) chip, an application specific integrated circuit (ASIC), or the like.

In various embodiments, the monitoring device 400 can include a first pressure sensor 406 channel interface (as used herein, reference to a pressure sensor shall include a pressure transducer unless the context dictates otherwise) and a first pressure sensor 426. In various embodiments, the monitoring device 400 can include a second pressure sensor 414 channel interface and a second pressure sensor 424. In various embodiments, the monitoring device 400 can include an "other" sensor channel interface 422 and an other sensor 448.

Pressure sensors herein can be of various types. Pressure sensors herein can include, but are not limited to, absolute pressure sensors, different pressure sensors, gauge pressure sensors, and the like. Pressure sensors herein can include those based on resistive, capacitive, piezoelectric, optical, metal thin-film, ceramic thick-film, and or MEMS components. Pressure sensors herein can also include diaphragm or and/or strain gauge-based designs. Microphones herein can include vibration sensors. Microphones and/or vibration sensors herein can be of various types including, but not limited to, unidirectional, omnidirectional, MEMS based microphones, piezoelectric microphones, magnetic microphones, electret condenser microphones, accelerometers, and the like.

The processing power of the control circuit 404 and components thereof can be sufficient to perform various operations including various operations on data from sensors including, but not limited to averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), predicting filtration system component (valves, timing boards, filter elements, etc.) EOL (end of life), identifying an EOL condition, predicting performance, predicting costs associated with replacing filtration system components vs. not-replacing components, normalizing data/signals, executing peak detection and/or peak fitting algorithms, and the like. Fourier analysis can decompose a physical signal into a number of discrete frequencies, or a spectrum of frequencies over a continuous range. In various embodiments herein, operations on signals/data can include Fast Fourier Transformations (FFT) to convert data/signals from a time domain to a frequency domain. Other operations on signals/data here can include spectral estimation, frequency domain analysis, calculation of root mean square acceleration value ($G_{RMS}$), calculation of acceleration spectral density, power spectral densities, Fourier series, Z transforms, resonant frequency determination, harmonic frequency determination, and the like. It will be appreciated that while various of the operations described herein (such as Fast Fourier transforms) can be performed by general-purpose microprocessors, they can also be performed more efficiently by digital signal processors (DSPs) which can, in some embodiments, be integrated with the control circuit 404 or may exist as separate, discrete components.

Calculations performed by the control circuit 404 and/or by a computing resource in communication with the monitoring system, can be used to identify abnormal valve event as described further herein. The term "abnormal" as used herein with respect to an abnormal valve event shall refer to observed conditions that deviate by at least a threshold value from a baseline or expected valve event in terms of various measurable parameters as described herein.

Normalizing operations performed by the control circuit 404 can include, but are not limited to, adjusting one or more values based on another value or set of values. As just one example, pressure drop data reflective of pressure drop across a filter element can normalized by accounting for air flow rate or a value that serves as a proxy thereof.

In various embodiments the control circuit can calculate a time for replacement of a filter element and generate a signal regarding the time for replacement. In various embodiments, the control circuit can calculate a time for replacement of a filter element and issue a notification regarding the time for replacement through a user output device. In various embodiments, the control circuit can calculate a time for replacement of a filter element based on signals from the first pressure sensor and the second pressure sensor. In various embodiments, the control circuit can calculate a time for replacement of a filter element based on signals from the first pressure sensor and the second pressure sensor and an external input. The external input can be received from a system user or from a remote location through a data communication network.

In various embodiments, the control circuit initiates an alarm if a predetermined alarm condition has been met. The alarm condition can include detection of a particular operational state or event of the filtration system. For example, the alarm condition can include the detected of a pulse valve failure. In some embodiments, the alarm condition can included one or more a maximum value for a signal received from the first pressure sensor, a minimum value for a signal received from the first pressure sensor, a maximum value for a signal received from the second pressure sensor, a minimum value for a signal received from the second pressure sensor, a maximum difference between a value for a signal received from the first pressure sensor and a value for a signal received from the second pressure sensor, and a minimum difference between a value for a signal received from the first pressure sensor and a value for a signal received from the second pressure sensor.

In various embodiments, the control circuit 404 can be configured to calculate a value correlated to a fluid flow rate through the filtration system based on a value provided by the first pressure sensor and a value provided by the second pressure sensor. In some embodiments, the control circuit 404 can be configured to calculate a value correlated to a fluid flow rate through the filtration system based on a static pressure value, wherein the static pressure value by a signal from at least one of the first pressure sensor and the second pressure sensor. In some embodiments, the control circuit can be configured to calculate a value correlated to a fluid flow rate through the filtration system based on a differential pressure value and a static pressure value, wherein the differential pressure value is determined by a signal from both the first pressure sensor relative and the second pressure sensor and the static pressure value by a signal from one of the first pressure sensor and the second pressure sensor.

The fluid flow rate of the system is determined by the characteristics of the motive source. For fan-based applications, the relationship between the static pressure and fluid flow is generally inverse in nature. As the system resistance increases, measured as static pressure, the fluid flow rate decreases and vice versa due to the operating characteristics of the fan. Since the fluid flow rate of the fan directly affects the fluid flow rate in other parts of the system, a fluid flow rate proxy for the fan and hence the filtration system can be calculated using the static pressure at a fixed location in the system. Generally, the static pressure in a fluid duct is proportional to the square of the fluid flow rate. As one example, the flow rate proxy value can be calculated according to the equation $$FRP = \sqrt{\left(\frac{P_s}{P_i}\right)} \times Q_i,$$

wherein FRP=flow rate proxy value, Ps is a static pressure value, Pi is the system design point static pressure, and Qi is an optional system design point fluid flow rate.

In some embodiments, a fan curve can also be used to calculate a value for a flow rate. The fan curve can be used to relate a static pressure with a flow rate. In various embodiments, the monitoring device 400 can store a fan curve in memory (which can be written to memory when the monitoring device 400 is manufactured or it can be received/updated based on data received through a network connection while the monitoring device 400 is being installed or after it is installed on a filtration system in the field).

In some embodiments, the monitoring device 400 can include an additional sensor, such as an accelerometer. For example, the monitoring device 400 can include a 3-axis accelerometer 430. The 3-axis accelerometer 430 can be used to detect vibrations transmitted from the filtration system to the monitoring device 400. The vibrations can result from various events such as periodically pulsing a brief jet of pressurized air into the interior of the filter element to reverse the air flow through the filter element and/or opening or closing pulse valve(s) to accomplish the same.

In some cases, it can be helpful to mount an accelerometer in the monitoring device 400 such that it receives vibrations from the filtration system with minimal diminishment of vibration in terms of frequency range and amplitude. In some embodiments, the accelerometer can be disposed within the housing such that vibrations incident upon a contact surface of the monitoring device housing are attenuated by less than 50% as incident upon the accelerometer. In some embodiments, the accelerometer can be disposed within the housing such that vibrations incident upon a contact surface of the monitoring device housing are attenuated by less than 10% as incident upon the accelerometer.

In various embodiments, the monitoring device 400 can include a power supply circuit 432. In some embodiments, the power supply circuit 432 can include various components including, but not limited to, a battery 434, a capacitor, a power-receiver such as a wireless power receiver, a transformer, a rectifier, and the like.

In various embodiments the monitoring device 400 can include an output device 436. The output device 436 can include various components for visual and/or audio output including, but not limited to, lights (such as LED lights), a display screen, a speaker, and the like. In some embodiments, the output device can be used to provide notifications or alerts to a system user such as current system status, an indication of a problem, a required user intervention, a proper time to perform a maintenance action, or the like.

In various embodiments the monitoring device 400 can include memory 438 and/or a memory controller. The memory can include various types of memory components including dynamic RAM (D-RAM), read only memory (ROM), static RAM (S-RAM), disk storage, flash memory, EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected to provide positive feedback operating as latches or flip flops, providing for circuits that have two or more metastable states, and remain in one of these states until changed by an external input. Data storage can be based on such flip-flop containing circuits. Data storage can also be based on the storage of charge in a capacitor or on other principles. In some embodiments, the non-volatile memory 438 can be integrated with the control circuit 404.

In various embodiments the monitoring device 400 can include a clock circuit 440. In some embodiments, the clock circuit 440 can be integrated with the control circuit 404. While not shown in FIG. 4, it will be appreciated that various embodiments herein can include a data/communication bus to provide for the transportation of data between components. In some embodiments, an analog signal interface can be included. In some embodiments, a digital signal interface can be included.

In various embodiment the monitoring device 400 can include a communications circuit 442. In various embodiments, the communications circuit can include components such as an antenna 444, amplifiers, filters, digital to analog and/or analog to digital converters, and the like.

In various embodiments, monitoring devices 400 herein are designed so that they can operate using only a battery for power and not deplete the battery for a long period of time such as weeks, months, or even years. As such, in various embodiments operations of the monitoring device 400 can be optimized to conserve energy consumption.

In some embodiments, the control circuit initiates a transitory change in a data recording parameter based on a signal received from the third pressure sensor. In some embodiments, the transitory change in the data recording parameter comprises increasing the resolution of the recorded data.

In some embodiments, the first pressure sensor and the second pressure generate signals discontinuously. In some embodiments, the first pressure sensor and the second pressure generate signals at predetermined time intervals.

Figure 5:
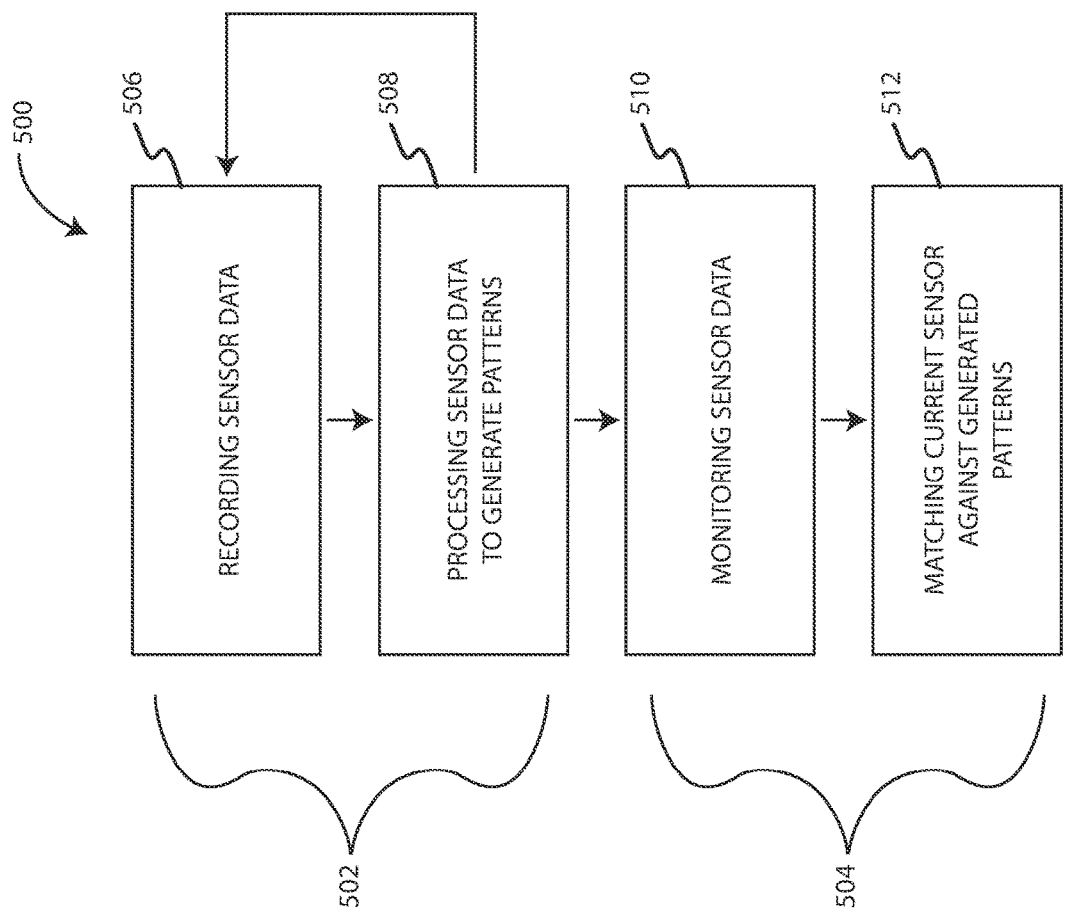
FIG. 5 is a flow chart of operations of a filtration monitoring system in accordance with various embodiments herein.

Referring now to FIG. 5, a flow chart of operations 500 of a filtration monitoring system in accordance with various embodiments herein. In some embodiments, the filtration monitoring system can be thought of as operating in two modes. While operating in the first mode 502, the system can record sensor data, such as recording 506 signals of one or more pressure sensors (and in some cases one or more microphones or vibration sensors) over a first time period. The system can then process 508 the sensor data to generate one or more patterns. For example, the system can generate one or more signal templates representing different operational states of a filtration system by processing the recorded signals of the pressure sensor while operating in the first mode 502 over the first time period. Patterns can be generated from sensor data (and/or other data) by the system using techniques as described below.

The first time period can vary in length. In some embodiments, the time period can be greater than or equal to 1, 5, 20, 60, 120, 180, 240, 600, 1200 minutes, 2 days, 5 days, 10 days, 1 month, 3 months, 6 months or longer. In some embodiments, the first time period can be an amount of time falling within a range between any of the foregoing.

While operating in the second mode 504, the patterns or templates generated during operation in the first mode can then be applied in order to characterize the current state of the filtration system. For example, while operating in the second mode 504, the system can monitor sensor data 510 and then compare signals of the pressure or other sensor(s) from a second time period and attempt to match 512 them against the one or more patterns or signal templates while operating in the second mode 504. Pattern matching can be performed by the system using techniques as described below. When a match is found between a pattern or signal template and current sensor data, the system can determine that the state associated with the pattern or signal template reflects the current operating state of the system. For example, the system can compare data from the pressure sensor reflecting a second time period against the derived valve opening pattern to identify an abnormal valve event.

In some embodiments, signals of a pressure sensor and/or other sensors from a second time period can be compared and/or matched against the signals from a first time period while operating in the second mode. In some embodiments, comparing signals can include extracting at least one signal feature from the signals representing the first time period and from the signals representing the second time period and comparing extracted the signal features. Such signal features can include one or more of pulse width times, pulse timing variability (such as statistical measures of variability including, but not limited to standard deviations), pulse magnitudes, pulse magnitude variability, maximum/minimum pressure v. time slope values, and the like.

In some embodiments, the system can specifically store data reflecting signals of the pressure sensor (and/or other sensors or data), evaluate the stored data representing a first time period to derive a starting pattern, compare data from the pressure sensor reflecting a second time period against the starting pattern, and identify an abnormal valve event based on a detected difference between the second time period data and the starting pattern. Data storage herein can, in some cases, be transitory and in other cases be long term storage.

In some embodiments, the first mode or learning mode can be broken down into two phases. In the first phase, a baseline pressure value can be established, such as a baseline pressure in the compressed air manifold 248 or another part of the system. The baseline pressure in the compressed air manifold 248 can be impacted based on a pressure of the compressed air input or source and/or other factors. Thus, in some embodiments, the monitoring system can be configured to check for one or more preconditions being met before generating one or more patterns or signal templates.

As an example, in some embodiments, the baseline pressure is only established when the compressed air input value meets certain criteria. For example, the baseline pressure value may only be established when the compressed air input value is above a threshold value and/or exhibits variation that is less than a threshold value. The threshold value can vary, but in some embodiments the threshold can be greater than or equal to 50 psi, 60 psi, 70 psi, 80 psi, 90 psi, 100 psi, 110 psi, 120 psi, 130 psi, 140 psi, or 150 psi, or can be an amount falling within a range between any of the foregoing.

In a second phase, pulses (such as caused by opening and closing of a pulse valve) can be observed and/or characterized. For example, if measuring pressure in the compressed air manifold 248, a pulse can be characterized by a rapid drop in pressure exceeding a threshold value, followed by a recovering in pressure rising back to or near the baseline value. For example, a drop in pressure exceeding 5, 10, 15, 20, 30, 40, or 50 psi over a time period of less than 1000, 750, 500, 250, 150, or 100 milliseconds can qualify as a pulse herein. When such a drop in pressure is observed, the data can be analyzed to characterize various operating parameters including, but not limited to, a typical time gap between successive pulses (valve opening and closing events) such as peak to successive peak or valley to successive valley times, the profile of a typical pulse (including at least one of a typical lowest pressure reached when a valve is open, a typical maximum/minimum slope of pressure vs. time as the valve is opening, a typical maximum/minimum slope of pressure vs. time as the valve is closing, the typical total amount of time elapsed since pressure starts changing in response to valve opening and reaching the maximum change from the baseline value (valve opening period), the typical total amount of time elapsed since pressure the maximum change in pressure from the baseline value until the pressure returns to the baseline value (valve closing period), the typical total amount of time that a valve is in an "on" state (e.g., the sum of the valve opening period, the valve closing period, and any period in between), the typical lowest or highest pressure reached during a valve operating event, and the like.

In some embodiments, the system can automatically start operation in the first mode or learning mode after initial startup of the monitoring system or filtration system, such as after initial installation of the monitoring system on or in a filtration system. The system can periodically revert back to the first mode of operation to update patterns. For example, the system can revert back to the first mode (or learning mode) upon receiving a user input to do so or upon receiving a command from a remote control facility. In some embodiments, the system can revert back to the first mode when a particular event or condition is detected. For example, in some embodiments, the system can revert back to the first mode when the replacement of one or more filter elements or valves is detected.

The patterns or signal templates applied and/or generated herein can reflect normal as well as abnormal operational states. The patterns or signal templates can also reflect specific operation states such as normal valve opening, abnormal valve opening, normal valve closing, abnormal valve closing, normal or abnormal pressure drop recovery after a cleaning event or filter element replacement, omitted valve opening events, other types of valve failure events, and the like.

In some cases, the monitoring system can be supplied with a set of initial patterns to use to provide some monitoring capabilities even while it is learning the patterns of the specific air filtration system that it is being used to monitor. In this way, the monitoring system can be useful for monitoring purposes even before it has had a chance to learn the patterns of the particular system on which it is installed. In some cases, the initial patterns can be specific for the model of the filtration system and be derived from evaluation of other filtration systems of the same model. In some cases, the initial patterns can be specific for the number of filter elements or valves in the filtration system and be derived from evaluation of other filtration systems with the same number of filter elements or valves.

Figure 6:
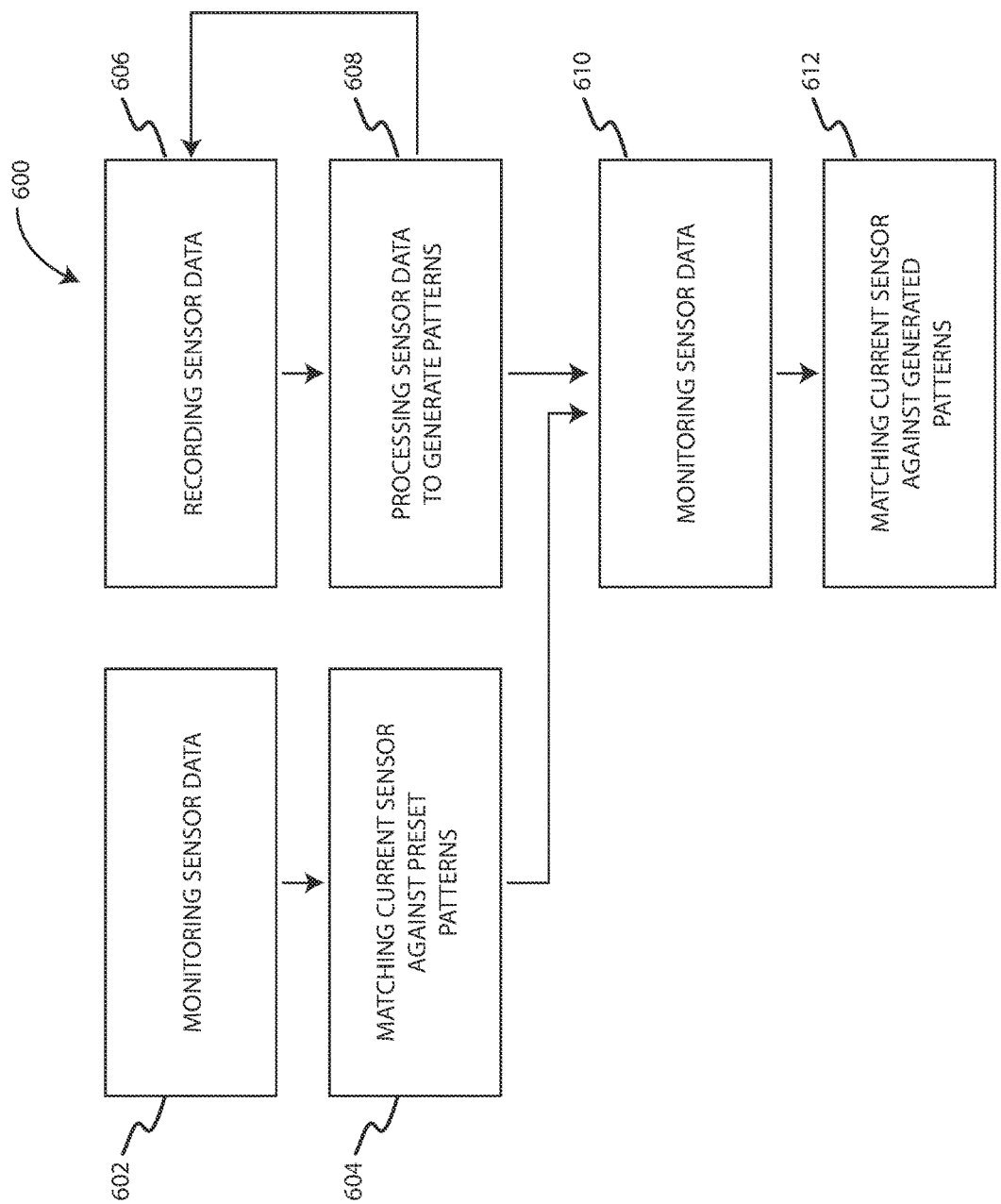
FIG. 6 is a flow chart of operations of a filtration monitoring system in accordance with various embodiments herein.

Referring now to FIG. 6, a flow chart of operations of a filtration monitoring system in accordance with various embodiments herein. The system can monitor sensor data 602 initially and then match 604 such sensor data against preset or predetermined patterns in order to provide an indication of the operational state of the filtration system and/or one or more components thereof. Simultaneously, similar to as described with respect to FIG. 5, the system can record sensor data 606 and the process 608 the sensor data to generate one or more patterns or templates. Then, the system can continue to monitor sensor data 610, but evaluate the data by matching 612 against generated patterns.

It will be appreciated that monitoring systems herein can be used to monitor filtration systems have any given number of filter elements. In some cases, the filtration system can have a single filter element. In other cases, the filtration system can have 2, 4, 6, 8, 12, 16, 20, 24, 36, 48, 96, 144, 288 or more filter elements, or a number of filter elements falling within a range between any of the foregoing. In some embodiments, the filtration system can have a number of valves matching the number of filter elements. In other embodiments, the filtration system can be configured so that each valve can function to provide cleaning of 2, 4, 6, 8 or more filter elements in the system. As such, in some embodiments, the filtration system includes a number of valves that is less than the number of filter elements that it includes.

In some embodiments, the filter elements can be organized into zones. Each zone can be serviced by one or more valves. In some embodiments herein, the sensor data patterns can be used to identify not only an operational event, but also identify a zone or specific component producing the detected operation event.

Figure 7:
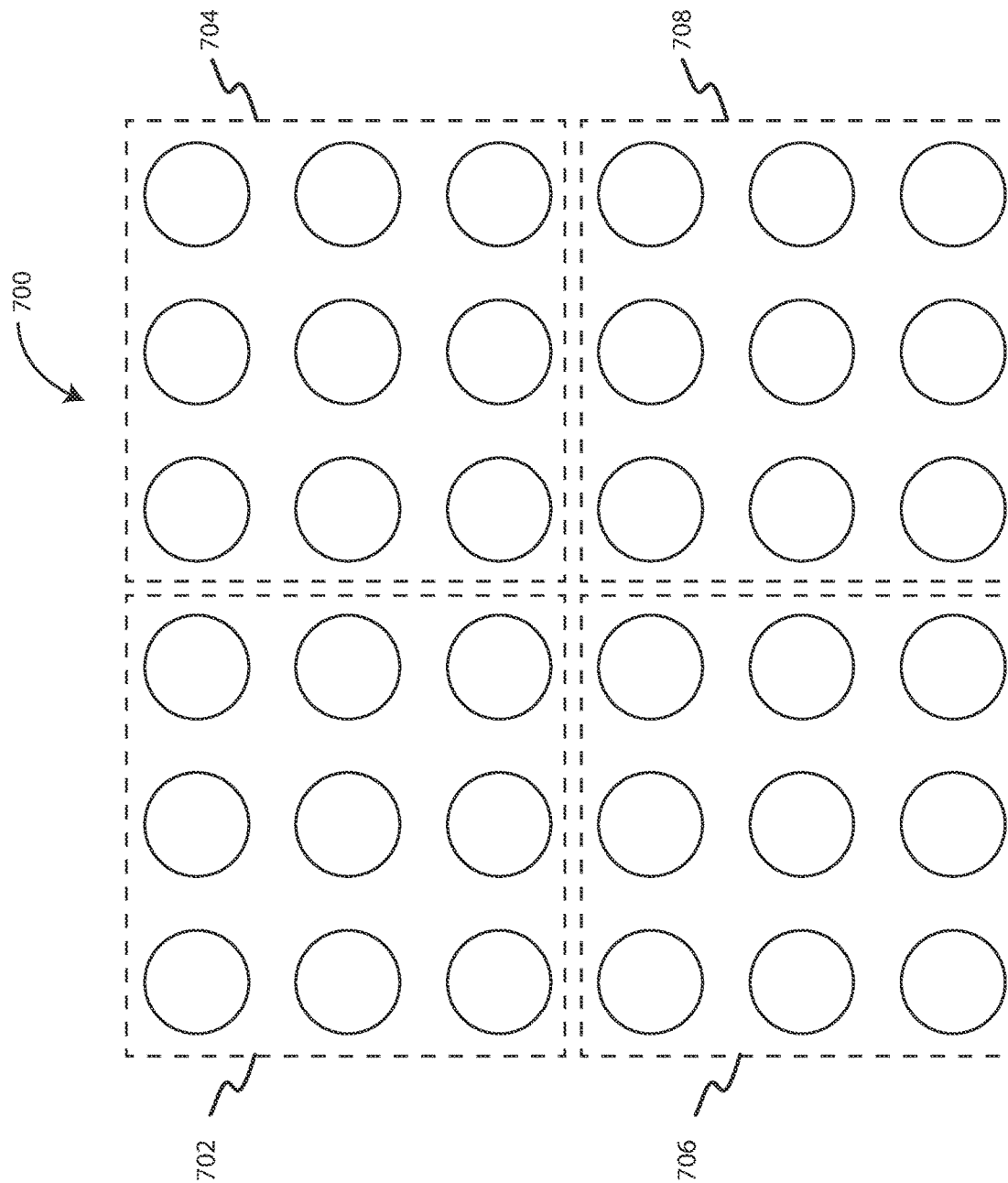
FIG. 7 is a diagram of filter elements as part of a filtration system herein.

Referring now to FIG. 7, a diagram is shown of an array 700 of filter elements as part of a filtration system herein. In this example, the array 700 can include a first zone 702, a second zone 704, a third zone 706, and a fourth zone 708. In various embodiments, a single pressure sensor (or single source of pressure data) can be used. In other embodiments, multiple pressure sensors (or sources of pressure data) can be used, such as one or more per zone. The data from one or more of the pressure sensors (or other sensors used) can be used for pattern/template generation and/or for later pattern/template matching. In some embodiments, the monitoring system can identify not only a particular operational event (such as normal or abnormal valve opening/closing), but also a zone of origination for the operational event as well as, in some cases, a particular filter element, valve, or other component identification.

Figure 8:
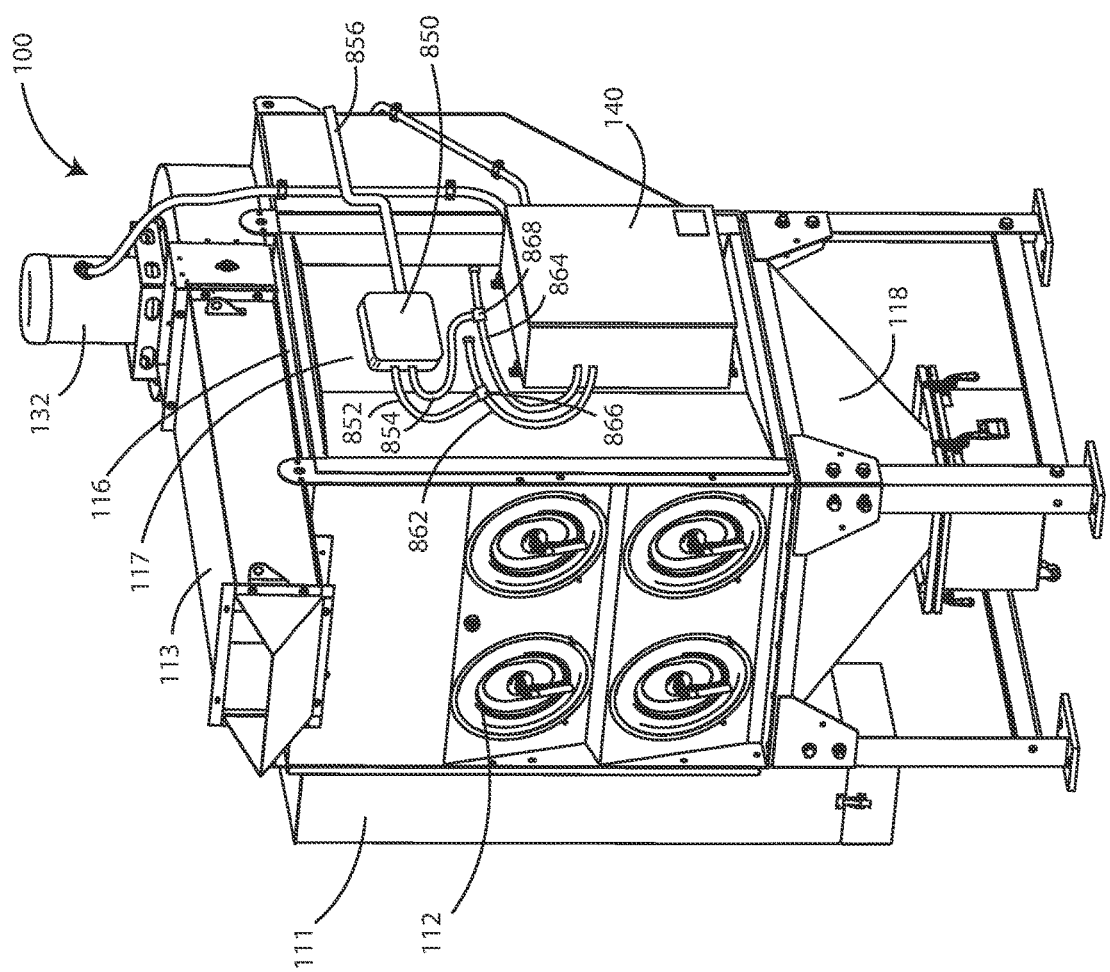
FIG. 8 is a schematic front perspective view of an air filtration system with a monitoring system in accordance with various embodiments herein.

Referring now to FIG. 8, a schematic front perspective view of an air filtration system with a monitoring system in accordance with various embodiments herein. FIG. 8 is generally similar to FIG. 1. However, FIG. 8 also shows monitoring device 850 that can be connected to a first fluid conduit 852, a second fluid conduit 854, and third fluid conduit 856. The fluid conduits can provide fluid communication between various parts of the filtration system (such as the dirty/upstream side, the clean/downstream side, a compressed air supply, etc.) and sensors/transducers that can be within or otherwise associated with the monitoring device 850. Thus, in such an embodiment, the sensors used may not be directly in such locations, but can be in fluid communication with such locations so that they can measure pressures in such locations. In some embodiments, the first fluid conduit 852 can be connected to an existing fluid conduit 862 of the air filtration system that provides fluid communication with an area of fluid flow that is upstream from the filtration element(s). In some embodiments, the first fluid conduit 852 can be connected to the existing fluid conduit 862 using a junction 866 (such as a T-junction, splice junction, or other connecting structure). The second fluid conduit 854 can be connected to an existing fluid conduit 864 of the air filtration system that provides fluid communication with an area of fluid flow that is upstream from the filtration element(s). In some embodiments, the second fluid conduit 854 can be connected to the existing fluid conduit 864 using a junction 868 (such as a T-junction, splice junction, or other similar connecting structure). In some embodiments, there is no electrical communication between the preexisting control box 140 and/or components therein such as a preexisting control circuit and the monitoring device 850. While not intending to be bound by theory, it is believed that this electronic separation can offer a security advantage as the preexisting control box 140 and components therein are responsible for operation of the filtration system 100 whereas the monitoring device 850 is only responsible for monitoring of the filtration system 100. In this way, the monitoring device 850 cannot be used as a means of gaining control over operation of the filtration system 100.

Figure 9:
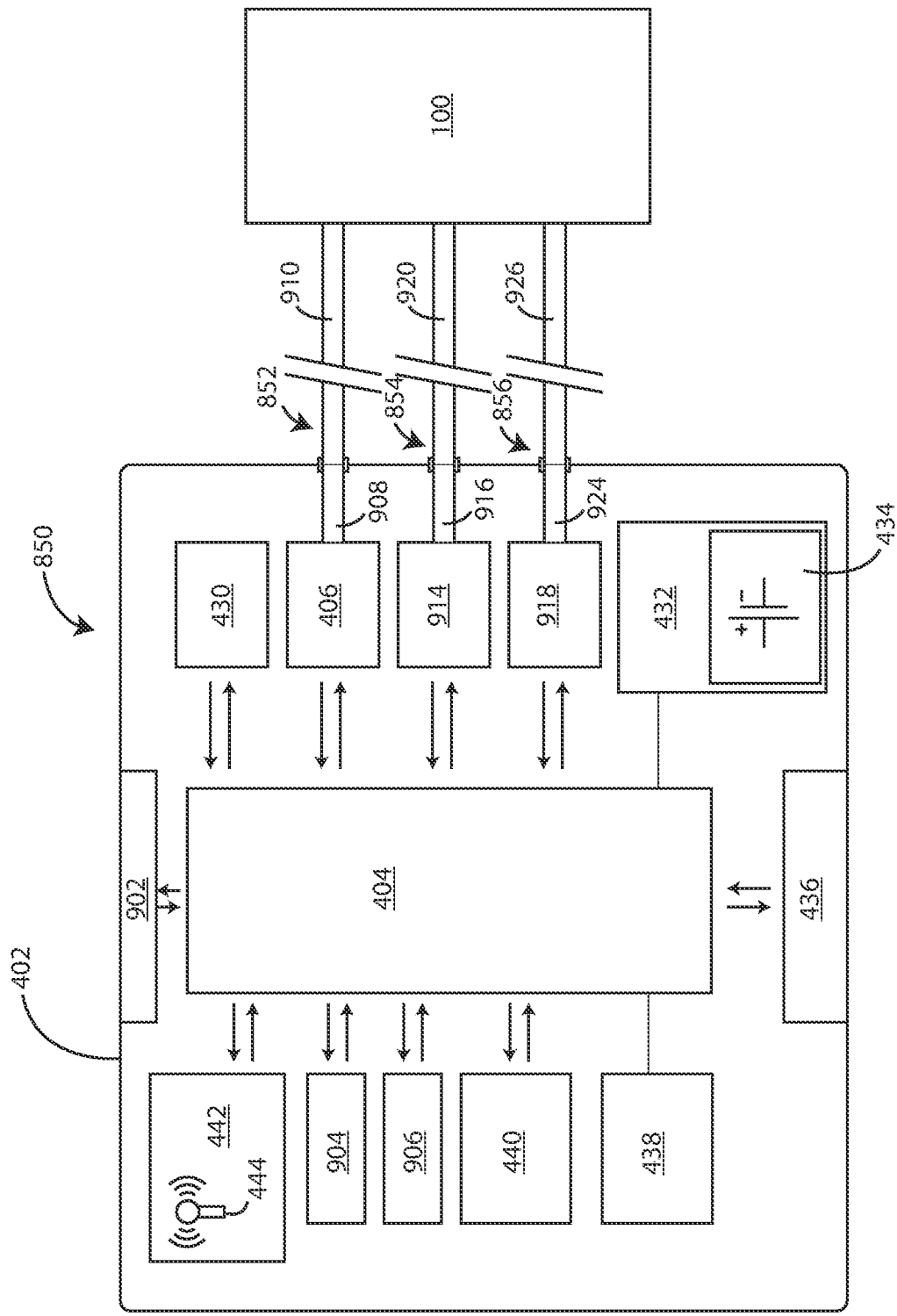
FIG. 9 is a schematic diagram is shown of elements of a filtration monitoring device in accordance with various embodiments herein.

Referring now to FIG. 9, a schematic diagram is shown of elements of a monitoring device 850 in accordance with various embodiments herein. FIG. 9 includes various components as shown in FIG. 4. However, the embodiment depicted in FIG. 6 can also include first fluid conduit 852 (in fluid communication with the filtration system 100) including an internal portion 908 and an external portion 910, as well as a second fluid conduit 854 (in fluid communication with the filtration system 100) including an internal portion 916 and an external portion 920, and a third fluid conduit 856 (in fluid communication with the filtration system 100) including an internal portion 924 and an external portion 926.

In some embodiments, the monitoring device 850 can also include an input interface 902 and/or user input device. The monitoring device 850 can also include a low-energy local wireless communication component 904. In some embodiments, the low-energy local wireless communication component 904 can include a Bluetooth component. In some embodiments, the system can be in communication with various sensors and/or devices that have sensors and exchange or receive data from the same through the low-energy local wireless communication component 904. In some embodiments, the monitoring device 850 can also include a wired I/O interface 906 and one or more wire connection ports or plug receptacles. In some embodiments, the system can be in communication with various sensors and/or devices that have sensors and exchange or receive data from the same through the wired I/O interface 906.

The monitoring device 850 can include various other sensors beyond a pressure sensor or a differential pressure sensor. In some embodiments, the monitoring device 850 can also include a temperature sensor 914. The temperature sensor 914 can be in fluid communication with at least one of the first fluid conduit, the second fluid conduit, and the third fluid conduit.

In some embodiments, the monitoring device 850 can also include a sound sensor 918, such as a microphone or vibration sensor. In some embodiments, the sound sensor 918 can be in fluid communication with at least one of the first fluid conduit, the second fluid conduit, and the third fluid conduit. In some embodiments, the monitoring device 850 can also include a humidity sensor.

Figure 10:
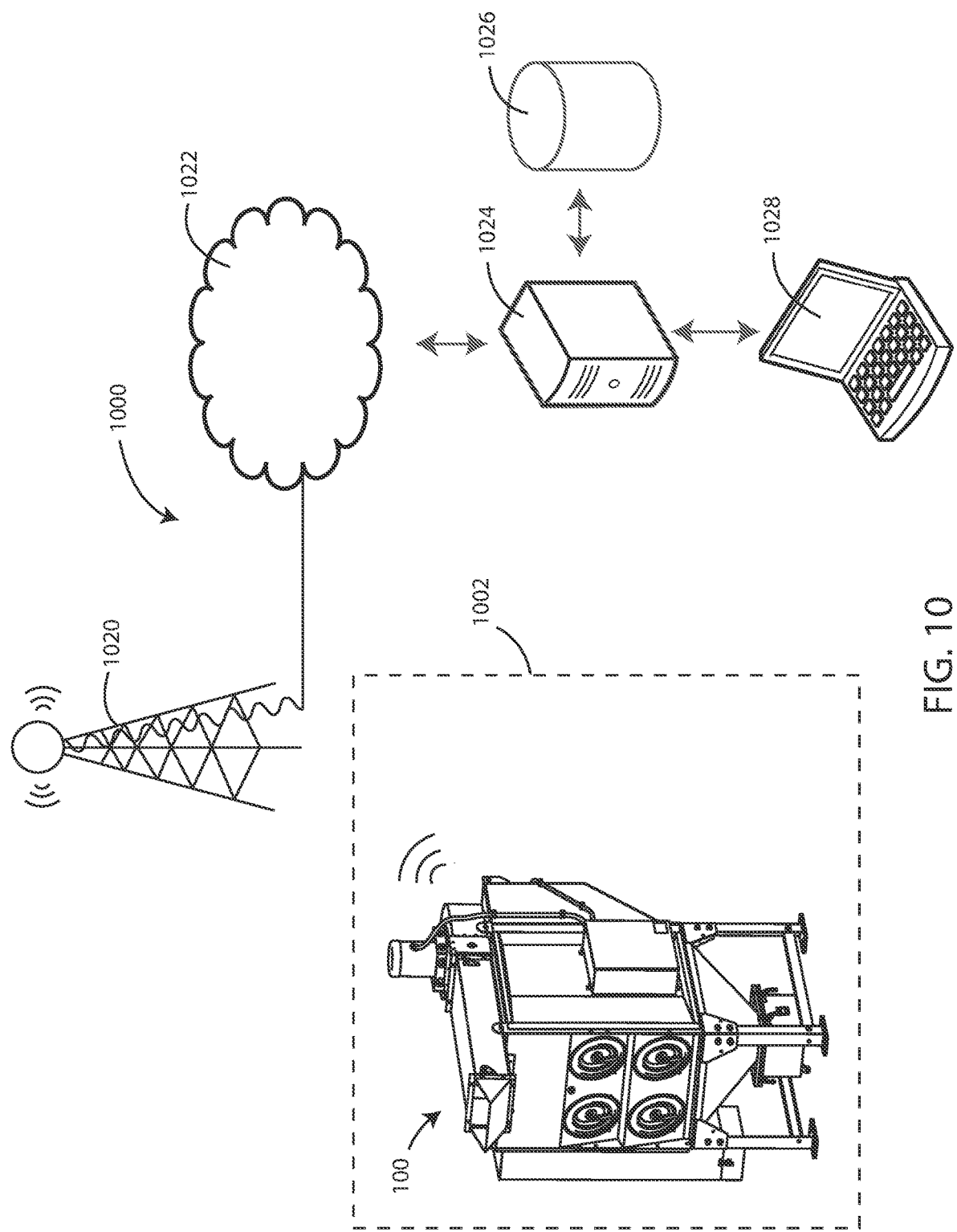
FIG. 10 is a schematic view is shown of a filtration system data communication environment in accordance with various embodiments herein.

Referring now to FIG. 10, a schematic view is shown of a filtration monitoring system data communication environment 1000 in accordance with various embodiments herein. The communication environment 1000 can include an air filtration system 100, such as a dust collector, a gas turbine filtration system, or another filtration system for various fluids including air. In some embodiments, the filtration system 100 can be within a work environment 1002. The work environment 1002 can represent a geographic area in which the air filtration system 100 operates. The work environment 1002 can be, for example, a shipping or distribution center, a manufacturing facility or factory, a power production plant, or the like.

In some embodiments, wireless signals from the filtration system 100 can be exchanged with a wireless communication tower 1020 (or antenna array), which could be a cellular tower or other wireless communication tower. The wireless communication tower 1020 can be connected to a data network 1022, such as the Internet or another type of public or private data network, packet-switched or otherwise.

The data network can provide for one-way or two-way communication with other components that are external to the work environment 1002. For example, a server 1024 or other processing device, or cloud computing resource, can receive electronic signals containing data from one or more components such as the filtration system 100. The server 1024 (real or virtual) can interface with a database 1026 (real or virtual) to store data. In some embodiments, the server 1024 (or a device that is part of the server system) can interface with a user device 1028, which can allow a user to query data stored in the database 1026. The server 1024 and/or the database 1026 can be at a distinct physical location or can be in the cloud.

Figure 11:
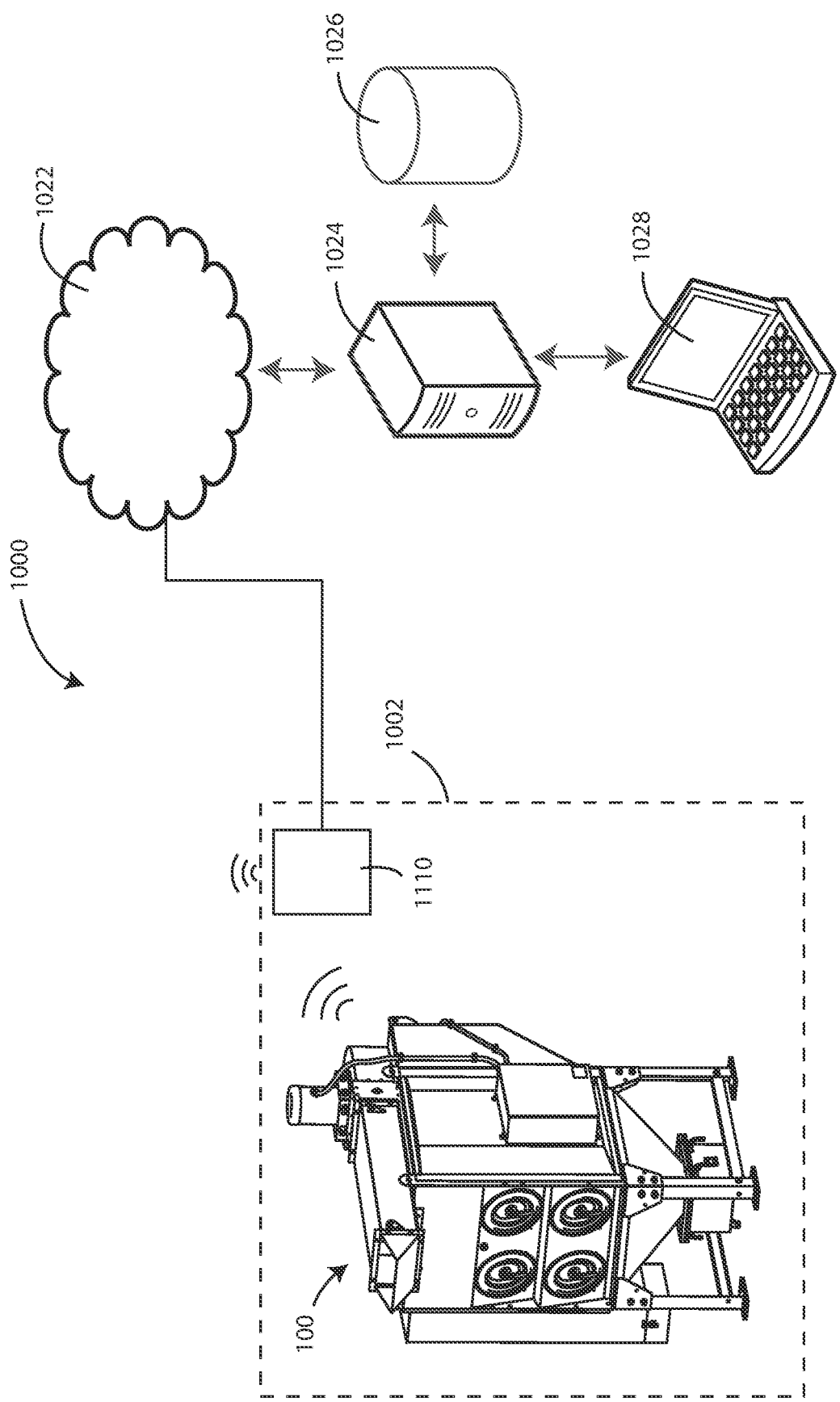
FIG. 11 is a schematic view is shown of a filtration system data communication environment in accordance with various embodiments herein.

Referring now to FIG. 11, a schematic view is shown of a filtration system data communication environment 1000 in accordance with various embodiments herein. In some embodiments, a gateway or repeater unit 1110 can be disposed within the work environment 1002. The gateway or repeater unit 1110 can, in some embodiments, communicate wirelessly with the filtration system 100 and/or one or more sensors that gather data that can be used by the filtration system 100. In some embodiments, the gateway or repeater unit 1110 can be connected to an external data network 1022, such as the Internet or various private networks. In some embodiments, the data network 1022 can be a packet-switched network. In some embodiments, the gateway or repeater 1110 can also include data network router functionality.

Figure 12:
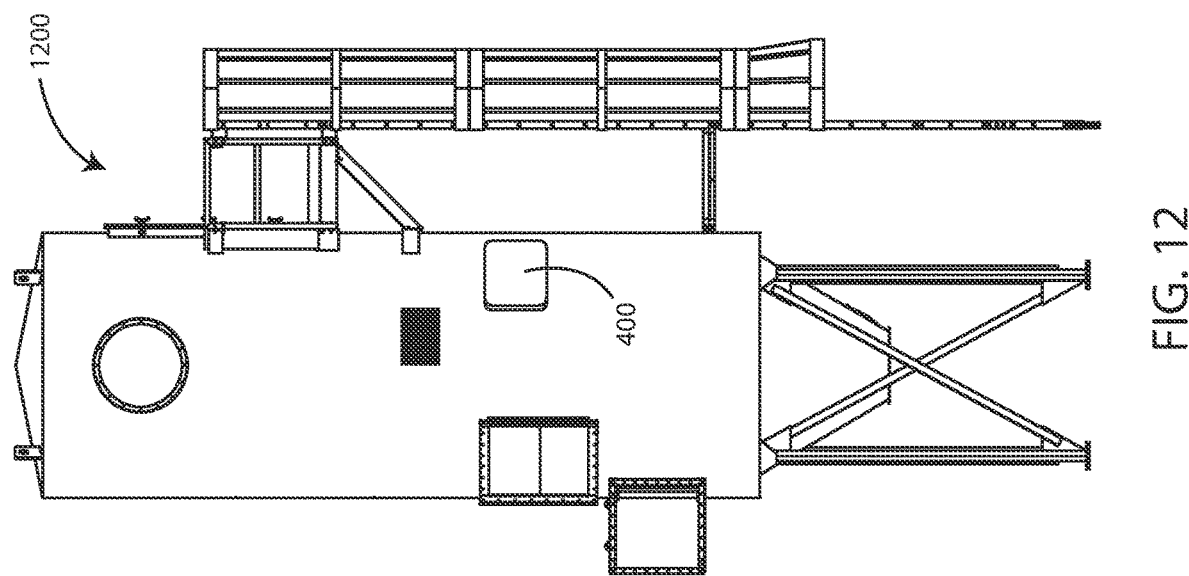
FIG. 12 is a schematic front perspective view of an air filtration system with a monitoring device in accordance with various embodiments herein.

It will be appreciated that many different types of filtrations systems are included herein. While previous figures herein such as FIGS. 1-3 illustrate a cartridge-based air filtration system, it will be appreciated that bag-type air filtration systems are also included herein. Referring now to FIG. 12, is a schematic front perspective view of an air filtration system 1200 with a filtration system monitoring device 400 in accordance with various embodiments herein. In this view, connections to the filtration system monitoring device 400 are not shown for ease of illustration. In operation, filter bags can be pulse cleaned periodically to maintain or reduce operating pressure drop, the filter bags tend to be pulse cleaned during operation. During a pulse cleaning operation, a pulse of air is directed through the filter bag in a direction opposite to normal filtering operations. The effect of the pulse of air has two important results. First, the pulse tends to cause the filter bag to flex in response to the increased internal pressure. Such outward flex movement tends to mechanically remove any build-up of particulate in the form of a filter cake on the exterior of the bag. Further, the increase in air flow in the opposite direction through the surface of the filter bag tends to cause the particulates to be removed by the action of the air passing through the porous openings within the filter bag structure. The result of the action of the air passing through the bag in an opposite direction during operations tends to reduce the quantity of any particulate or filter cake that forms on the exterior of the filter bag, thus returning the filter bag to a pressure drop that is typically more commensurate with efficient operation of the structure. Such pulse cleaning operations can be performed using a variety of internal structures within the bag house. The bag house can contain internal fans that can direct a stream of air in the opposite direction through the housing structure. Alternatively, the housing can contain an air orifice or spray head that can be installed within the support structure or can be moved from support structure to support structure to introduce a reverse pulse stream of air into the interior of the bag house. Monitoring devices herein can be connected to such filtration systems such that fluid communication is provided with areas of the filtration system (such as the clean or downstream side of the filter bags and the dirty or upstream side of the filter bags) and sensors in, or otherwise in electrical communication with, the monitoring device. Further aspects of bag-type air filtration systems are described in U.S. Pat. No. 6,740,412, the content of which is incorporated herein by reference.

Embodiments of systems herein can be used to determine information regarding the operational status and/or configuration of many different types of filtration systems. In some embodiments, monitoring systems herein can be used to identify timing board misconfigurations. Referring now to FIG. 13, a schematic illustration is shown of a pattern 1302 of pulses for a dust collector with bad valves. In specific, a series of pulse cycles 1304 (pulses of each valve in the system as controlled by a timing board) are shown including detected pulses 1308 followed by two missing pulses 1310. In this case, the repeating cycles 1304 are identical in that the position 1306 of the missing pulses 1310 within the cycles 1304 stays the same. This situation is generally caused by bad valves (corresponding to the two missing pulses 1310) and can be identified as such by the monitoring system. However, referring now to FIG. 14, a schematic illustration is shown of a pattern of pulses 1402 illustrating dust collector timing board misconfiguration. In this case, the pulse cycles 1304 are not identical to one another. Rather, the position 1306 of missing pulses 1310 with respect to the cycles 1304 changes. This situation is generally caused by a dust collector timing board misconfiguration and can be flagged by the monitoring system. Thus, in various embodiments herein, the monitoring system can determine whether a pattern of pulses including missing pulses repeats identically or exhibits a regular shifting or sliding behavior indicative of a timing board misconfiguration and then record information on the same, issue an alert, notification, or transmission regarding the misconfiguration, mark an event in memory, and/or or alert a system operator regarding the same, or the like.

In some embodiments, monitoring systems herein can be used to identify timing board malfunctions. Generally, timing boards controlling valve pulses operated such that there is a degree of timing regularity between pulses within each pulse cycle. Therefore, if timing irregularity is detected, this can be a sign that the timing board is malfunctioning. Referring now to FIG. 15, a schematic illustration is shown of a pattern 1502 of pulses consistent with a timing board for a dust collector operating normally. The time gap 1504 between the first and second pulse is approximately the same as the following time gaps (1506, 1508, 1510, 1512, 1514, and 1526). In this example, the time gaps could reflect an approximate 10 second interval between pulses, but could also be configured to be other amounts of time.

In contrast, referring now to FIG. 16, a schematic illustration is shown of a pattern 1602 of pulses consistent with a timing board malfunctioning. In this example, the time gaps are irregular. The second time gap 1506 is longer than the first time gap 1504 and the third time gap 1508. The fourth time gap 1510 is longer than the second time gap 1506 and significantly longer than the fifth time gap 1512 and the sixth time gap 1514. In this case, the timing board can be determined by the system to be malfunctioning and an alert or notification can be issued regarding the same and/or a system operator can be alerted regarding the same. In various embodiments herein, the monitoring system can record time stamps along with each detected pulse and then perform analysis on the timing of the same. For example, the system can evaluate time gap lengths and determine a degree of regularity of the timing by calculating a statistical or mathematical measure of the same (such as determining a standard deviation of the timing, entropy metrics, other regularity metrics, or the like). In some embodiments, the system can be configured to calculate a standard deviation (or other measure of regularity) for timing of a selected set of pulses (e.g., time intervals of pulses and/or time gaps between pulses, or the like) and then if the measure of regularity crosses a threshold value (preset or, in some cases, dynamically derived) the system can take actions such as record information on the same, issue an alert, notification, or transmission regarding the possible timing board malfunction, mark an event in memory, and/or or alert a system operator regarding the same, or the like. In the case of standard deviation, threshold values can vary, but can be 100 ms, 250 ms, 500 ms, 750 ms, 1 second, 2.5 seconds, 5 seconds, 10 seconds, 20 seconds, 30 seconds, or more, or an amount falling within a range between any of the foregoing. Timing measurement of pulses can be measured from detected starts of pulses, detected ends of pulses, or determined midpoints of pulses, or the like.

Methods

Many different methods are contemplated herein, including, but not limited to, methods of monitoring filtration systems, methods of monitoring valves for filtration systems, methods of detecting system misconfiguration, methods of detecting malfunctioning components, and the like. Aspects of system/device operation described elsewhere herein can be performed as operations of one or more methods in accordance with various embodiments herein.

In various embodiments, operations described herein and/or method steps can be performed as part of a computer-implemented method executed by one or more processors of one or more computing devices. In various embodiments, operations described herein and method steps can be implemented instructions stored on a non-transitory, computer-readable medium that, when executed by one or more processors, cause a system to execute the operations and/or steps.

In an embodiment, a method for monitoring valves in an air filtration system is included. The method can include storing data reflecting signals of a pressure sensor, evaluating the stored data representing a first time period to derive a valve operating pattern, and comparing data from the pressure sensor obtained after the first time period against the derived valve operating pattern to identify an abnormal valve event.

In an embodiment, the method can further include sending a notification if an abnormal valve event is identified.

In an embodiment, the method can further include measuring pressure in the air filtration system in a compressed air manifold.

In an embodiment, the method can further include using data from a microphone in combination with the data from the pressure sensor to derive the valve operating pattern and identify the abnormal valve event.

In an embodiment, a method for monitoring valves in an air filtration system using a monitoring system is included. The method can include recording signals of a pressure sensor while the monitoring system is operating in a first mode over a first time period. The method can further include generating one or more signal templates representing different operational states of a filtration system by processing the recorded signals of the pressure sensor while the monitoring system is operating in the first mode over the first time period. The method can further include comparing signals of the pressure sensor obtained after the first time period against the one or more signal templates while the monitoring system is operating in a second mode.

In an embodiment, the method can further include generating one or more signal templates representing different operational states of a filtration system valve by processing the recorded signals of the pressure sensor while operating in the first mode over the first time period.

In an embodiment, the method can further include checking for one or more preconditions before generating one or more signal templates.

In an embodiment, the method can further include detecting an abnormal valve event by matching signals of the second time period with a signal template.

In an embodiment, the method can further include detecting a valve failure event by matching signals of the second time period with a signal template.

In an embodiment, the method can further include sending a notification if a valve failure event is detected.

In an embodiment, the method can further include using data from the microphone in combination with the data from the pressure sensor to generate the one or more signal templates and compare signals of the pressure sensor along with the microphone obtained after the first time period against the one or more signal templates while operating in the second mode.

In an embodiment, a method of monitoring valves of an air filtration system with a monitoring system is included. The method can include storing data reflecting signals of a pressure sensor, evaluating the stored data representing a first time period to derive a starting pattern, comparing data from the pressure sensor obtained after the first time period against the starting pattern, and identifying an abnormal valve event based on a detected difference between data after the first time period and the starting pattern.

In an embodiment, the method can further include sending a notification if an abnormal valve event is identified.

In an embodiment, the method can further include using data from the microphone in combination with the data from the pressure sensor to derive the starting pattern and identify the abnormal valve event.

In an embodiment, a method of detecting abnormal valve events of a filtration system is included. The method can include storing data reflecting signals of a microphone, evaluating the stored data representing a first time period to derive a valve operating pattern, and comparing data from the microphone obtained after the first time period against the derived valve operating pattern to identify an abnormal valve event.

In an embodiment, the method can further include sending a notification if an abnormal valve event is identified.

In an embodiment, the method can further include measuring pressure in a compressed air manifold of the air filtration system, storing data reflecting signals of the pressure sensor along with data reflecting signals of the microphone, evaluating the stored data of both the pressure sensor and the microphone to derive a valve operating pattern, and comparing data from both the pressure sensor and the microphone against the derived operating pattern to identify the abnormal valve event.

In an embodiment, a method of monitoring an air filtration system is included. The method can include operating in a first mode, recording signals of a microphone while operating in the first mode over a first time period, and generating one or more signal templates representing different operational states of a filtration system by processing the recorded signals of the pressure sensor while operating in the first mode over the first time period. The method can further include operating in a second mode and comparing signals of the microphone obtained after the first time period against the one or more signal templates while operating in the second mode.

In an embodiment, the method can further include generating one or more signal templates representing different operational states of a filtration system valve by processing the recorded signals of the microphone while operating in the first mode over the first time period.

In an embodiment, the method can further include checking for one or more preconditions before generating one or more signal templates.

In an embodiment, the method can further include detecting an abnormal valve event by matching signals of the second time period with a signal template. In an embodiment, the method can further include detecting a valve failure event by matching signals of the second time period with a signal template.

In an embodiment, the method can further include sending a notification if a valve failure event is detected.

In an embodiment, the method can further include measuring pressure in a compressed air manifold of the air filtration system, utilizing signals of the pressure sensor in combination with signals of the microphone, generating signal templates and later compare signals against signal templates.

In an embodiment, a method of identifying an abnormal valve event is included. The method can include storing data reflecting signals of a microphone, evaluating the stored data representing a first time period to derive a starting pattern, comparing data from the microphone obtained after the first time period against the starting pattern, and identifying an abnormal valve event based on a detected difference between data after the first time period and the starting pattern.

In an embodiment, the method can further include sending a notification if an abnormal valve event is identified.

In an embodiment, the method can further include generating signals reflecting sound in a compressed air manifold of an air filtration system.

In an embodiment, the method can further include measuring pressure in a compressed air manifold of the air filtration system, utilizing signals of the pressure sensor in combination with signals of the microphone to derive a starting pattern, and later comparing signals gathered after the first time period against the starting pattern and identifying an abnormal valve event.

In an embodiment, a method of detecting timing board misconfiguration within a filtration system is included. The method can include evaluating data reflecting signals of a sensor to detect valve opening events within a valve opening timing cycle, detecting missing valve opening events within the valve opening timing cycle, and evaluating whether the order of missing valve opening events is shifting within successive cycles to detect a misconfigured timing board.

In an embodiment, the method can further include issuing a notification or alert when a misconfigured timing board has been detected.

In an embodiment, the method can further include initiating changing the configuration of the timing board when a misconfigured timing board has been detected. Initiating can include issuing a suggestion to a system operator.

In an embodiment, a method of detecting a malfunctioning timing board within a filtration system is included. The method can include evaluating data reflecting signals of a sensor to detect valve opening events, determining time intervals between detected valve opening events, calculating a degree of regularity of determined time intervals, and determining that a timing board of the air filtration system is malfunctioning when the degree of regularity crosses a threshold value.

In an embodiment, the method can further include issuing a notification or alert when a malfunctioning timing board has been determined. In an embodiment, the method can further include initiating servicing or replacing the timing board when a malfunctioning timing board has been determined.

Pattern/Template Generation and Pattern Matching

It will be appreciated that in various embodiments herein, a device or a system can be used to detect a pattern or patterns indicative of an operational event of a fluid filtration system. Such patterns can be detected in various ways. Some techniques are described elsewhere herein, but some further examples will now be described.

In various embodiments, the air filtration monitoring system can be configured to detect filtration system operational events. In some embodiments, filtration system operational events can be identified based on identifying or matching characteristic patterns in the data from a pressure sensor, a microphone, and/or other sensors. For example, a "positive" pattern for sensor data associated with a particular operational event can be stored by the system and current data can be periodically matched against such a pattern. If a match exceeding a threshold value is found, then an operational event can be deemed to have taken place. As another example, a "negative" pattern for sensor data associated with a particular operational event can be stored by the system and current data can be periodically matched against such a pattern.

In some embodiments, one or more sensors (such as pressure sensors, microphones or vibration sensors, or the like) can be operatively connected to a controller (such as the control circuit 404 described in FIG. 4) or another processing resource (such as a processor of another device or a processing resource in the cloud). The control circuit 404 or other processing resource can be adapted to receive data representative of an operational state of the filtration system from one or more of the sensors and/or determine statistics of the filtration system over a monitoring time period based upon the data received from the sensor(s). As used herein, the term "data" can include a single datum or a plurality of data values or statistics. The term "statistics" can include any appropriate mathematical calculation or metric relative to data interpretation, e.g., probability, confidence interval, distribution, range, or the like. Further, as used herein, the term "monitoring time period" means a period of time over which characteristics of the filtration system are measured and statistics are determined. The monitoring time period can be any suitable length of time, e.g., 1 second, 10 seconds, 30 seconds, 1 minute, 10 minutes, 30 minutes, 1 hour, 1 day, 1 week, 1 month, etc., or a range of time between any of the foregoing time periods.

Any suitable technique or techniques can be utilized to determine statistics for the various data from the sensors, e.g., direct statistical analyses of time series data from the sensors, differential statistics, comparisons to baseline or statistical models of similar data, etc. Such techniques can be general or system-specific and represent long-term or short-term operational behavior. These techniques could include standard pattern classification methods such as Gaussian mixture models, clustering as well as Bayesian approaches, machine learning approaches such as neural network models and deep learning, and the like.

Further, in some embodiments, the controller or control circuit 404 can be adapted to compare data, data features, and/or statistics against various other patterns, which could be predetermined or starting patterns (baseline patterns) based on the type or model of the filtration system, one or more predetermined patterns that serve as patterns indicative of an occurrence of an operational event of the filtration system (positive example patterns), one or more predetermined patterns that service as patterns indicative of the absence of an operational event (negative example patterns), or the like. As merely one scenario, if a pattern is detected for a filtration system that exhibits similarity crossing a threshold value to a particular positive example pattern or substantial similarity to that pattern, wherein the pattern is specific for an operational event, then that can be taken as an indication of an occurrence of the operational event has occurred.

Similarity and dissimilarity can be measured directly via standard statistical metrics such normalized Z-score, or similar multidimensional distance measures (e.g., Mahalanobis or Bhattacharyya distance metrics), or through similarities of modeled data and machine learning. These techniques can include standard pattern classification methods such as Gaussian mixture models, clustering as well as Bayesian approaches, neural network models, and deep learning.

As used herein the term "substantially similar" means that, upon comparison, the sensor data are congruent or have statistics fitting the same statistical model, each with an acceptable degree of confidence. The threshold for the acceptability of a confidence statistic may vary depending upon the filtration system, sensor(s), sensor arrangement, type of data, context, condition, etc.

The statistics associated with the operational status of a filtration system over the monitoring time period, can be determined by utilizing any suitable technique or techniques, e.g., standard pattern classification methods such as Gaussian mixture models, clustering, hidden Markov models, as well as Bayesian approaches, neural network models, and deep learning.

Various embodiments herein specifically include the application of a machine learning classification model. In various embodiments, the filtration system monitoring device can be configured to periodically update the machine learning classification model based on indicators of particular operational events. In some embodiments, user input can be used to positively identify particular operational events and then this information can be used as part of a supervised machine learning approach to positively characterize patterns associated with particular operational events. For example, if a filtration system valve has failed, a user can input this information into the system and then data corresponding in time with the failure can be processed in order to generate a pattern that is indicative of valve failure.

In some embodiments, a training set of data can be used in order to generate a machine learning classification model. The input data can include pressure data, microphone or vibration sensor data, and/or data as described herein as tagged/labeled with binary and/or non-binary classifications of particular filtration system operational states and/or operational events. Binary classification approaches can utilize techniques including, but not limited to, logistic regression, k-nearest neighbors, decision trees, support vector machine approaches, naive Bayes techniques, and the like. Multi-class classification approaches (e.g., for non-binary classifications of stress) can include k-nearest neighbors, decision trees, naive Bayes approaches, random forest approaches, and gradient boosting approaches amongst others.

Aspects may be better understood with reference to the following examples. These examples are intended to be representative of specific embodiments, but are not intended as limiting the overall scope of embodiments herein.

EXAMPLES

Example 1: Acoustic Valve Health Characterization

A microphone was used to capture sound data for a first filtration system including a normally operating pulse valve and a second filtration system including a faulty/failing pulse valve.

Figure 17:
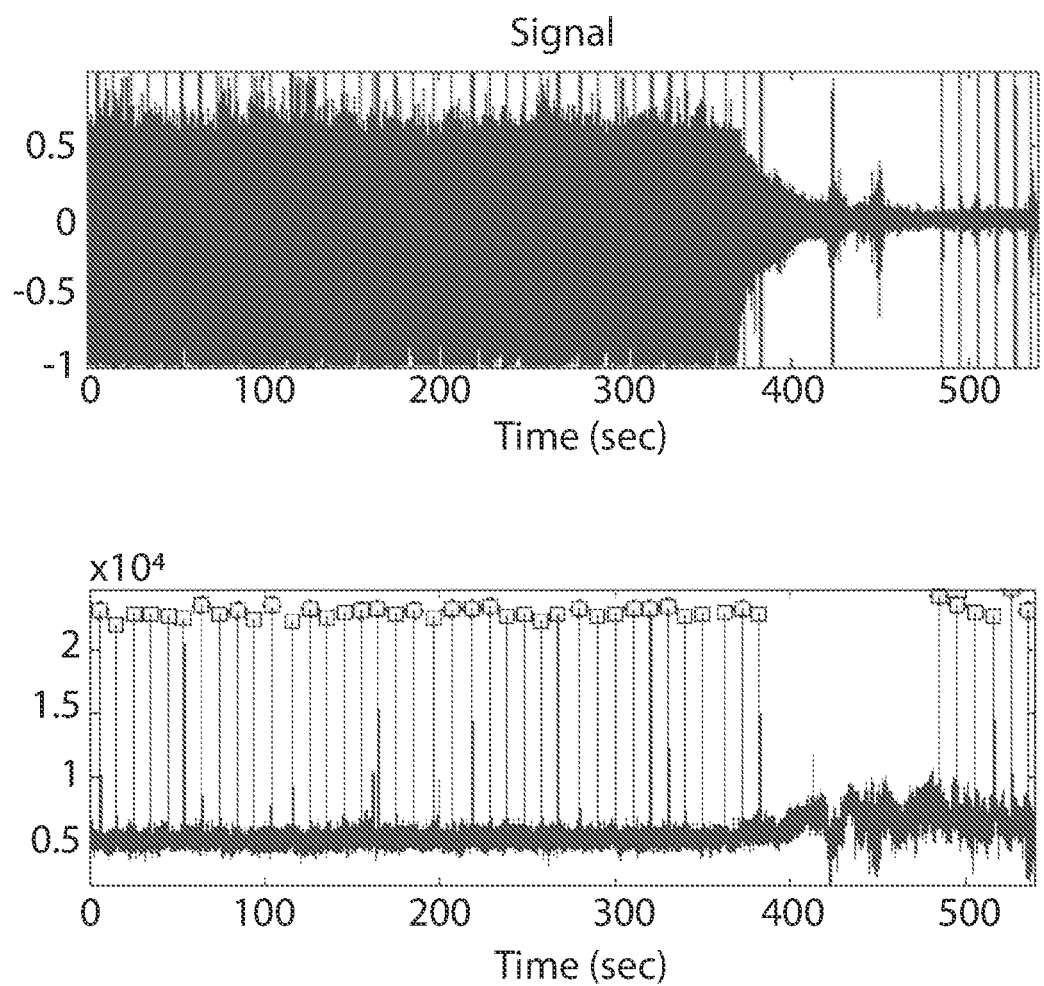
FIG. 17 is a graph showing acoustic/microphone data over time for a normal pulse valve.
Figure 18:
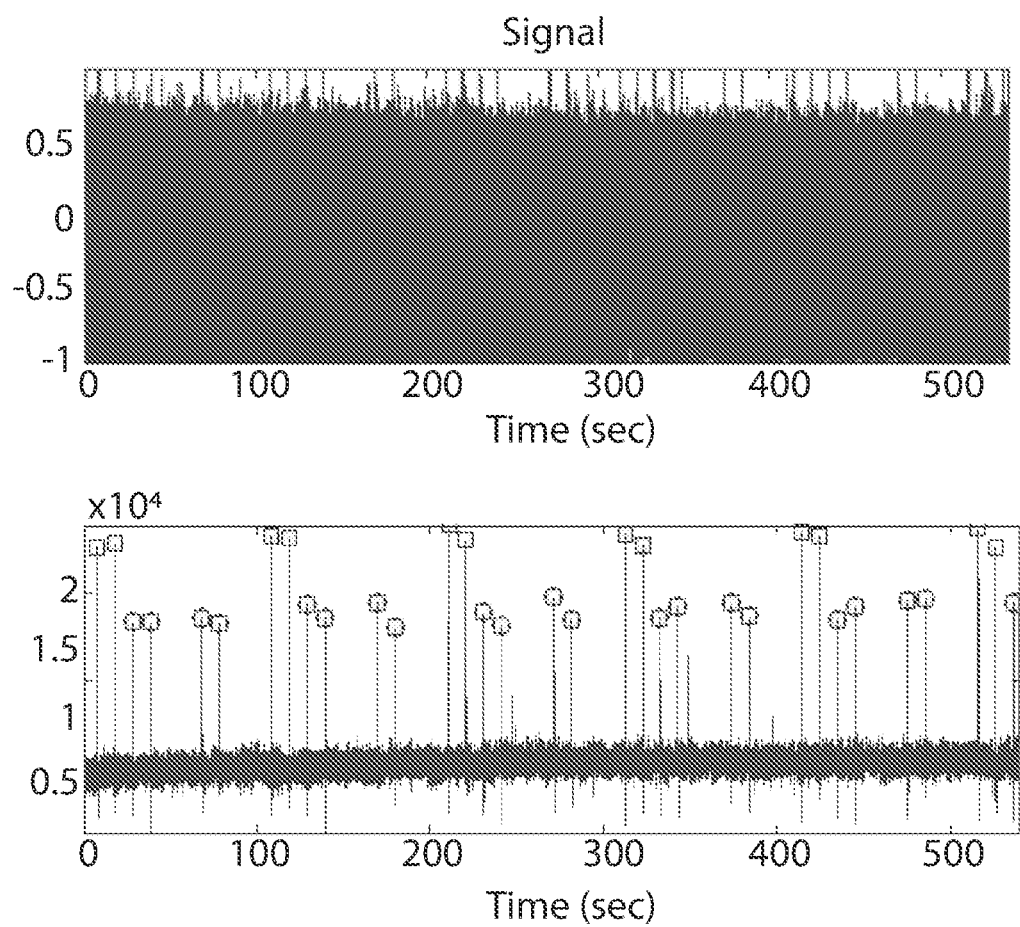
FIG. 18 is a graph showing acoustic/microphone data over time for an abnormal (faulty) pulse valve.

The signals were recorded and then evaluated. The results are shown in FIGS. 17 and 18. Specifically, FIG. 17 is a graph showing acoustic/microphone data over time for a normal pulse valve. FIG. 17 shows the raw signal (top graph) as well as the time sequence of spectral content for the signal (bottom graph). The period in FIG. 17 on the right hand side lacking substantial peaks in the time sequence of spectral content reflects a period of time when the filtration system was not in use. FIG. 18 is a graph showing acoustic/microphone data over time for a system with abnormal (weak and broken) valves. FIG. 18 shows the raw signal (top graph) as well as a time sequence of spectral content for the signal (bottom graph).

As can be seen, the normal pulse valve exhibits a regular pattern of spectral contents with little peak amplitude variations. The abnormal pulse valves either have spectral contents with smaller peak magnitudes (for weak valve case) or missing spectral content peaks (for broken valve case). As such, this example shows that sensor data patterns can be used to identify operational events, such as valve opening events, as well as distinguish between normal pulse valves and abnormal pulse valves.

Example 2: Acoustic Valve Health Characterization

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise. It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A monitoring system for an air filtration system comprising:
   a control circuit; and
   a pressure sensor, wherein the pressure sensor is in electronic communication with the control circuit;
   wherein the monitoring system is configured to
      store data reflecting signals of the pressure sensor from a first time period, wherein the stored data representing the first time period comprises a first series of valve pulses;
      extract a first signal feature from the stored data representing the first time period;
      store data reflecting signals of the pressure sensor from a second time period after the first time period, wherein the data from the pressure sensor obtained after the first time period comprises a second series of valve pulses;
      extract a second signal feature from the stored data representing the second time period; and
      compare the second signal feature with the first signal feature to identify an abnormal valve event.

2. The monitoring system of claim 1, wherein the monitoring system does not receive electrical signals from a control system of the air filtration system regarding a control signal to open valves.

3. The monitoring system of claim 1, wherein the monitoring system is configured to send a notification if an abnormal valve event is identified.

4. The monitoring system of claim 1, wherein the pressure sensor is configured to measure pressure in the air filtration system in a compressed air manifold.

5. The monitoring system of claim 1, the pressure sensor comprising an array of pressure sensors.

6. The monitoring system of claim 1, the abnormal valve event comprising at least one of an abnormal valve opening event, an abnormal valve closing event, and an omitted valve opening event.

7. The monitoring system of claim 1, further comprising a microphone;
   wherein the monitoring system is configured to use data from the microphone in combination with the data from the pressure sensor to identify the abnormal valve event.

8. A monitoring system for an air filtration system comprising:
   a control circuit; and
   a pressure sensor, wherein the pressure sensor is in electronic communication with the control circuit;
   wherein the monitoring system is configured to
      operate in a first mode;
      record signals of the pressure sensor while operating in the first mode over a first time period, wherein the recorded signals of the pressure sensor while operating in the first mode over the first time period comprise a first series of valve pulses;
      generate one or more signal templates representing different operational states of a filtration system by processing the recorded signals of the pressure sensor while operating in the first mode over the first time period;
      operate in a second mode;
      record signals of the pressure sensor while operating in the second mode over a second time period that is after the first time period, wherein the recorded signals of the pressure sensor while operating in the second mode over the second time period comprise a second series of valve pulses; and
      compare the signals of the pressure sensor obtained at the second time period against the one or more signal templates while operating in the second mode.

9. The monitoring system of claim 8, wherein the monitoring system is configured to generate one or more signal templates representing different operational states of a filtration system valve by processing the recorded signals of the pressure sensor while operating in the first mode over the first time period.

10. The monitoring system of claim 8, wherein the monitoring system is configured to detect an abnormal valve event by matching signals of the second time period with a signal template.

11. The monitoring system of claim 8, wherein the monitoring system is configured to detect a valve failure event by matching signals of the second time period with a signal template.

12. The monitoring system of claim 8, further comprising a microphone;
   wherein the monitoring system is configured to use data from the microphone in combination with the data from the pressure sensor to generate the one or more signal templates and compare signals of the pressure sensor along with the microphone obtained after the first time period against the one or more signal templates while operating in the second mode.

13. The monitoring system of claim 1, the first signal feature and the second signal feature comprising one of pulse width time(s), pulse timing variability, pulse magnitude(s), pulse magnitude variability, maximum pressure vs. time slope value(s), and minimum pressure vs. time slope value(s).

14. The monitoring system of claim 1, wherein the monitoring system is configured to correlate the second series of valve pulses to the first series of valve pulses and identify one or more missed valve pulses in the second series of valve pulses.

15. The monitoring system of claim 1, wherein the monitoring system is configured to diagnose one or more of faulty valves or a dust collector timing board misconfiguration based on the one or more missed valve pulses in the second series of valve pulses.

\* \* \* \* \*